US007626535B2

(12) United States Patent
Ding et al.

(10) Patent No.: US 7,626,535 B2
(45) Date of Patent: Dec. 1, 2009

(54) TRACK QUALITY BASED MULTI-TARGET TRACKER

(75) Inventors: Zhen Ding, Waterloo (CA); Abhijit Sinha, Hamilton (CA); Thia Kirubarajan, Mississauga (CA); Mohamad Farooq, Kingston (CA)

(73) Assignee: Raytheon Company, Waltham, MA (US)

( * ) Notice: Subject to any disclaimer, the term of this patent is extended or adjusted under 35 U.S.C. 154(b) by 103 days.

(21) Appl. No.: 11/756,913

(22) Filed: Jun. 1, 2007

(65) Prior Publication Data

US 2008/0111730 A1     May 15, 2008

Related U.S. Application Data

(60) Provisional application No. 60/857,771, filed on Nov. 9, 2006.

(51) Int. Cl.
*G01S 13/66* (2006.01)

(52) U.S. Cl. .............................. 342/95; 342/90; 342/96; 342/97

(58) Field of Classification Search .................. 342/90, 342/93–97, 195
See application file for complete search history.

(56) References Cited

U.S. PATENT DOCUMENTS

| | | | |
|---|---|---|---|
| 3,603,998 A | 9/1971 | Kassel | |
| 3,618,087 A | 11/1971 | Smith et al. | |
| 3,701,989 A | 10/1972 | Calhoon, Sr. et al. | |
| 4,170,774 A | 10/1979 | Schaefer | |
| 4,404,561 A | 9/1983 | Mulder et al. | |
| 4,649,388 A | 3/1987 | Atlas | |
| 4,649,390 A | 3/1987 | Andrews et al. | |
| RE33,152 E | 1/1990 | Atlas | |
| 4,961,075 A | 10/1990 | Ward | |
| 5,093,662 A | 3/1992 | Weber | |
| 5,202,691 A | 4/1993 | Hicks | |
| 5,374,932 A * | 12/1994 | Wyschogrod et al. | ......... 342/36 |
| 5,414,643 A | 5/1995 | Blackman et al. | |

(Continued)

FOREIGN PATENT DOCUMENTS

EP     0 132 232 A2     1/1985

(Continued)

OTHER PUBLICATIONS

Target perceivability and its applications Ning Li; Li. X.R; Signal Processing, IEEE Transactions on [see also Acoustics, Speech, and Signal Processing, IEEE Transactions on] vol. 49, Issue 11, Nov. 2001 pp. 2588-2604.*

(Continued)

*Primary Examiner*—Thomas H Tarcza
*Assistant Examiner*—Cassi Galt
(74) *Attorney, Agent, or Firm*—Daly, Crowley, Mofford & Durkee, LLP

(57) ABSTRACT

Various embodiments are described herein for a track quality based multi-target tracker and an associated method. The method includes associating a measurement with a track, generating measurement association statistics for the track, generating and updating a track quality value for a track based on a measurement-to-track association likelihood, and updating track lists based on the track quality value and the measurement association statistics of the tracks in these lists. The tracker includes structure for carrying out this method.

27 Claims, 10 Drawing Sheets

U.S. PATENT DOCUMENTS

| | | | |
|---|---|---|---|
| 5,568,151 A | 10/1996 | Merritt | |
| 5,648,782 A | 7/1997 | Albo et al. | |
| 5,909,189 A * | 6/1999 | Blackman et al. | 342/90 |
| 5,982,320 A | 11/1999 | Simpson et al. | |
| 6,130,638 A | 10/2000 | Winter et al. | |
| 6,243,037 B1 * | 6/2001 | Pulford et al. | 342/95 |
| 6,260,759 B1 * | 7/2001 | Nguyen et al. | 235/411 |
| 6,278,401 B1 * | 8/2001 | Wigren | 342/195 |
| 6,292,136 B1 | 9/2001 | Egnell | |
| 6,377,204 B1 | 4/2002 | Wurman et al. | |
| 6,420,997 B1 * | 7/2002 | Cong | 342/70 |
| 6,567,037 B1 * | 5/2003 | Fung et al. | 342/29 |
| 6,618,324 B1 | 9/2003 | Lane | |
| 6,704,692 B1 * | 3/2004 | Banerjee et al. | 702/189 |
| 6,819,285 B1 | 11/2004 | Stockman et al. | |
| 6,888,493 B2 * | 5/2005 | Driessen et al. | 342/91 |
| 6,993,460 B2 * | 1/2006 | Beadle et al. | 702/196 |
| 7,026,979 B2 | 4/2006 | Khosla | |
| 7,030,809 B2 * | 4/2006 | McCabe et al. | 342/195 |
| 7,095,358 B2 | 8/2006 | Krikorian et al. | |
| 7,193,557 B1 * | 3/2007 | Kovacich et al. | 342/89 |
| 7,218,270 B1 * | 5/2007 | Tamburino | 342/96 |
| 7,333,052 B2 * | 2/2008 | Maskell | 342/195 |
| 7,499,571 B1 * | 3/2009 | Han et al. | 382/103 |

FOREIGN PATENT DOCUMENTS

| | | |
|---|---|---|
| EP | 0 132 232 B1 | 1/1985 |
| WO | WO 98/21603 | 5/1998 |
| WO | WO 2006/035041 A1 | 4/2006 |

OTHER PUBLICATIONS

Automatic track formation in clutter with a recursive algorithm Bar-Shalom,Y.; Chang, K.C.; Blom, H.A.P.; Decision and Control, 1989., Proceedings of the 28th IEEE Conference on Dec. 13-15, 1989 pp. 1402-1408 vol. 2.*

Cai et al.; "EM-ML Algorithm for Track Initialization using Possibly Noninformative Data;" IEEE Transactions on Aerospace and Electronic Systems; vol. 41, No. 3, Jul. 2005; pp. 1030-1048.

Ding et al.: "Track Quality Based Multitarget Tracking Algorithm;" slides presented at SPIE Conference on Signal Small Targets, Orlando, FL; Apr. 19, 2006; 17 pages.

Ristic; "A Comparison of MHT and 2D Assignment Algorithm for Tracking with an Airborne Pulse Doppler Radar;" $5^{th}$ Int'l Symposium on Signal Processing and its Applications; ISSPA '99, Brisbane, Australia; Aug. 22-25, 1999; pp. 341-344.

Sinha et al.; "Track Quality Based Multitarget Tracking Algorithm;" SPIE Conference on Signal and Data Processing of Small Targets (#6236-08), Orlando, FL; Apr. 2006; 12 pages.

Hubbard et al.; "Dual Beam Radar System;" U.S. Appl. No. 11/760,188, filed Jun. 8, 2007; 59 pages.

"Alaska Wind Turbine Study —Phase 2", Raytheon document, Mar. 2006, 29 pages.

"Wind Turbines and Radar: Operational Experience and Mitigation Measures", Report to a consortium of wind energy companies, Dec. 2001, Spaven Consulting 2001, 39 pages.

"The Effects of Wind Turbine Farms on ATC Radar", Open Report, AWC/WAD/72/665/TRIALS, May 10, 2005, 44 pages.

"Feasibility of Mitigating the Effects Of Windfarms on Primary Radar", ETSU W/14/00623/Rep, DTI PBU URN No. 03/976; Contractor, Alenia Marconi Systems Limited, Prepared by MM. Butler, D.A. Johnson, First Published in Jun. 2003.

"Feasibility of Mitigating the Effects of Windfarms on Primary Radar", Project Summary W/14/00623, Jun. 2003, 4 pages.

Report to the Congressional Defense Committees, "The effect on Windmill Farms on Military Readiness", Office of the Director of Defense Research and Engineering, Jan. 2006, 62 pages.

Bar-Shalom et al., An Interacting Multiple Model (IMM) Estimator, Multitarget-Multisensor Tracking: Principles and Techniques, YBS Publishing, © 1995.

Bertsekas, The Auction Algorithm 2-D Assignment, Linear Network Optimization, Algorithms and Codes, MIT Press, Cambridge, Massachusetts, USA, © 1991.

Yeom et al., Track Segment Association, Fine-Step IMM and Initialization with Doppler for Improved Track Performance, IEEE Trans. on Aerospace and Electronic Systems, vol. 40, No. 1, pp. 293-309, Jan. 2004.

* cited by examiner

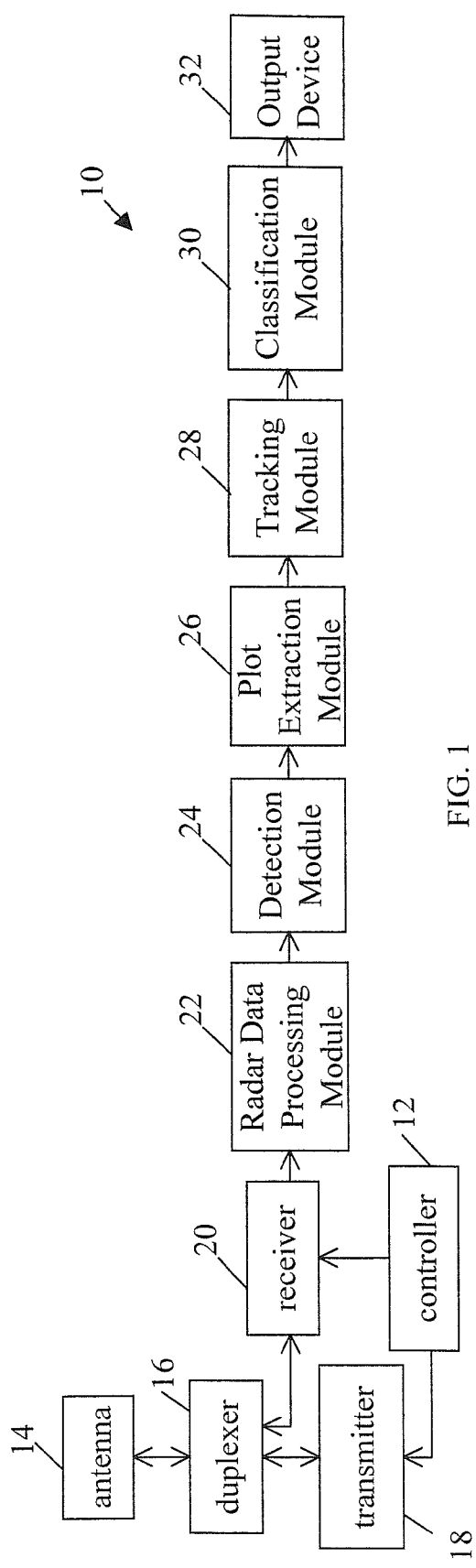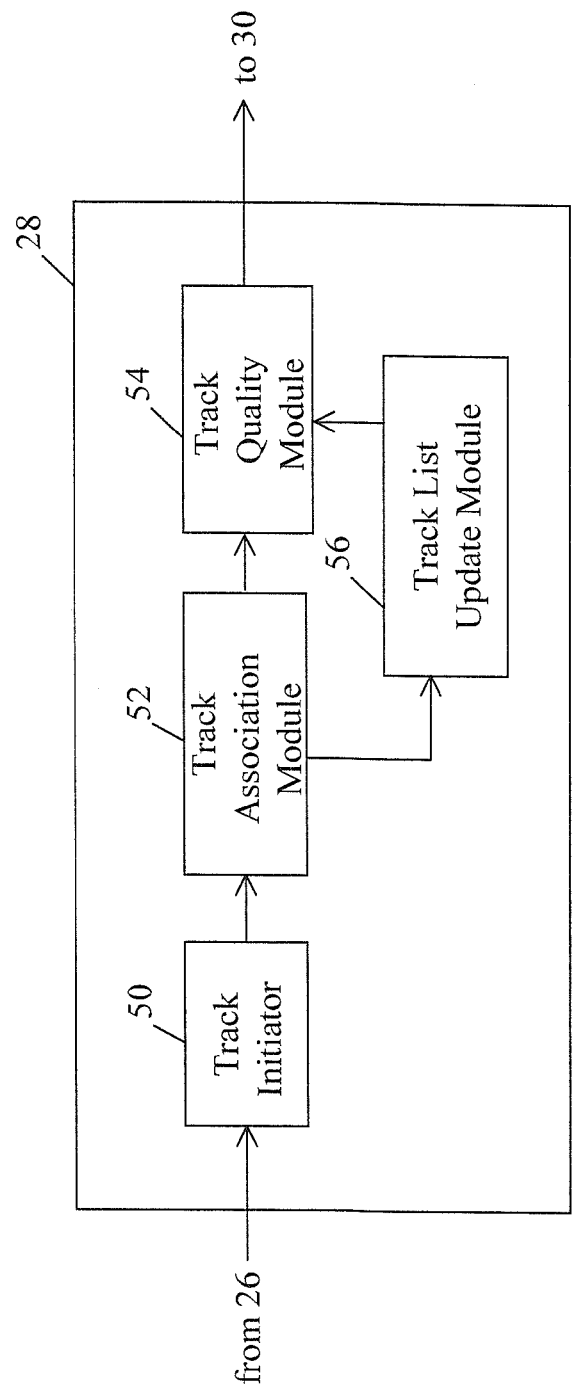

TRACK QUALITY BASED MULTI-TARGET TRACKER

CROSS-REFERENCE TO RELATED APPLICATIONS

The present application claims the benefit of U.S. Provisional Patent Application No. 60/857,771, filed on Nov. 9, 2006, under 35 U.S.C. §119(e) which application is incorporated herein by reference.

FIELD OF THE INVENTION

Various embodiments are described herein relating to a tracker for general use in target tracking for applications including radar systems, sonar systems and the like.

BACKGROUND OF THE INVENTION

A multi-target tracking system designer encounters decision problems related to track initialization, measurement to track association, track confirmation and track termination as well as possibly employing an m-detection-out-of-n time steps logic. These decisions can be difficult in a dense clutter scenario. Conventionally, these decisions can be made based upon the total number of measurement associations, length of no associations and the total life of the track in question. A decision rule based upon the above quantities can be called a fixed rule. Such a decision rule affects true tracks (i.e., a track on a real or true target) and false tracks (i.e., a track on a target which is not real) in a similar way and also tends to produce inferior results since tracks cannot be discriminated from false tracks. For instance, if a strict decision rule is applied, then the number of false tracks and the average length of the false tracks would decrease. However, the corresponding performance measures for the true tracks would be affected similarly, which is undesirable. On the other hand, if a loose decision rule is applied, then longer average track lives would result for both true and false tracks as well as an increase in the number of false tracks.

The general stages of a tracking method include a track initialization stage, a track maintenance stage (by data association) and a track termination stage. Probabilistic data association (PDA) based methods are a popular approach for the track maintenance stage, which relaxes the otherwise binding constraint of assigning one track to only one measurement and weighs the contribution of each measurement by the probability that it is target originated. Another group of tracking methods, unlike the PDA tracking methods, retains the single track to single measurement association constraint. These methods are known as assignment based methods since they use assignment or global nearest neighbor approaches to associate measurements to tracks. Since different measurements are associated with different targets, these methods avoid the track coalescence problem that occurs in closely spaced target scenarios. However, the assignment-based methods can have higher performance uncertainty than the PDA based methods due to the hard decision requirement in the former.

SUMMARY OF THE INVENTION

In one aspect, at least one embodiment described herein provides a tracking module for tracking a detected target. The tracking module comprises a track association module, a track quality module and a track list update module. The track association module is configured to associate a measurement with a track and generate measurement association statistics for the track. The track quality module is configured to generate and update a track quality value for a track based on a measurement-to-track association likelihood, and the track list update module is configured to update track lists based on the track quality value and the measurement association statistics of the tracks in these lists.

The track lists comprise a list of initial tracks, a list of confirmed tracks, and a list of unobservable tracks.

The tracking module can also comprise a track initiator configured to generate a preliminary version of the track.

For a current time step, the track association module can be configured to associate measurements from a measurement list with the list of confirmed tracks, then the list of unobservable tracks, and then the list of initial tracks.

More particularly, for a current time step, the track association module can be configured to associate measurements from a measurement list with the list of confirmed tracks and remove the associated measurements from the measurement list to generate a first updated measurement list, then associate measurements from the first updated measurement list with the list of unobservable tracks and remove the associated measurements from the first updated measurement list to generate a second updated measurement list, then associate measurements from the second updated measurement list and a third updated measurement list corresponding to a previous time step with the list of initial tracks and remove the associated measurements from the second updated measurement list to generate a third updated measurement list.

The track list update module can be configured to process the list of initial tracks by deleting the initial tracks with a track quality value less than a first track quality threshold.

The track list update module can be configured to move a remaining initial track to the list of confirmed tracks if the remaining initial track has a track quality value at the current time step and a track quality value at a previous time step that are both greater than a second track quality threshold, and measurement association statistics that indicate a number of associations greater than or equal to $n_i$ where $n_i$ is an integer.

The track list update module can be configured to process the list of confirmed tracks by deleting the confirmed tracks with a track quality value less than a third track quality threshold.

The track list update module can be configured to move a remaining confirmed track to the list of unobservable tracks if the measurement association statistics of the remaining confirmed track indicates no measurement associations in the last $n_{na}$ time steps where $n_{na}$ is an integer.

The track list update module can be configured to process the list of unobservable tracks by deleting the unobservable tracks with a track quality value less than a third track quality threshold.

The track list interaction module can be configured to move a remaining unobservable track to the list of confirmed tracks if the remaining unobservable track has a track quality value greater than a second track quality threshold and measurement association statistics that indicate a number of new associations greater than or equal to na where na is an integer.

The track quality module can be configured to predict the track quality value at a future time step $P(k+1|k)$ given a track quality value at a current time step by multiplying a probability of a target existing for the track with the track quality value after an update at the current time step.

When the track is associated with a measurement at a future time step, the track quality module can be configured to calculate a track quality value $P(k+1|k+1)$ by calculating a first sum by adding a likelihood that the target corresponding to the track exists and the associated measurement is from the target with a likelihood that the target exists and the associated measurement is a false alarm, calculating a second sum by adding the first sum with a likelihood that the target does not exist and the associated measurement is a false alarm, and dividing the first sum by the second sum.

For instance, when the track is associated with a measurement at a future time step, the track quality module can be configured to calculate a track quality value P(k+1|k+1) according to:

$$P(k+1|k+1) = \frac{1 - \pi_d^1(1 - \Lambda(k+1))}{1 - \pi_d^1(1 - \Lambda(k+1))P(k+1|k)} P(k+1|k)$$

where $\pi_d^1$ is a total detection probability inside a detection gate for the target, $$\Lambda(k+1) = \frac{f(z(k+1)|x(k+1|k))}{f(z(k+1)|\emptyset)},$$

$f(z(k+1)|x(k+1|k))$ is a likelihood of a measurement z(k+1) given a predicted position of the target x(k+1|k), $f(z(k+1)|\Phi)$ is a density of false alarm at z(k+1) and k is the current time step.

When the track is not associated with a measurement at a future time step, the track quality module can be configured to calculate a track quality value P(k+1|k+1) by calculating a first sum by adding a likelihood that the target corresponding to the track exists and it is not detected with a likelihood that the target does not exist, and dividing the likelihood that the target corresponding to the track exists by the first sum.

For instance, when the track is not associated with a measurement at a future time step, the track quality module can be configured to calculate a track quality value P(k+1|k+1) according to:

$$P(k+1|k+1) = \frac{1 - \pi_d^2}{1 - \pi_d^2 P(k+1|k)} P(k+1|k)$$

where $\pi_d^2$ is a total detection probability inside the detection gate.

In another aspect, at least one embodiment described herein provides a method of detecting a target, the method comprising associating a measurement with a track, generating measurement association statistics for the track, generating and updating a track quality value for a track based on a measurement-to-track association likelihood, and updating track lists based on the track quality value and the measurement association statistics of the tracks in these lists. The track lists comprise a list of initial tracks, a list of confirmed tracks, and a list of unobservable tracks.

The method can further comprise generating a preliminary version of the track.

For a current time step, the method comprises associating measurements from a measurement list with the list of confirmed tracks, then the list of unobservable tracks, and then the list of initial tracks.

More particularly, for a current time step, the method comprise: associating measurements from a measurement list with the list of confirmed tracks, removing the associated measurements from the measurement list to generate a first updated measurement list, associating measurements from the first updated measurement list with the list of unobservable tracks, removing the associated measurements from the first updated measurement list to generate a second updated measurement list associating measurements from the second updated measurement list and a third updated measurement list corresponding to a previous time step with the list of initial tracks, and removing the associated measurements from the second updated measurement list to generate a third updated measurement list.

The method can comprise processing the list of initial tracks by deleting the initial tracks with a track quality value less than a first track quality threshold.

The method can comprise moving a remaining initial track to the list of confirmed tracks if the remaining initial track has a track quality value at the current time step and a track quality value at a previous time step that are both greater than a second track quality threshold, and measurement association statistics that indicate a number of associations greater than or equal to $n_i$ where $n_i$ is an integer.

The method can comprise processing the list of confirmed tracks by deleting the confirmed tracks with a track quality value less than a third track quality threshold.

The method can comprise moving a remaining confirmed track to the list of unobservable tracks if the measurement association statistics of the remaining confirmed track indicates no measurement associations in the last $n_{na}$ time steps where $n_{na}$ is an integer.

The method can comprise processing the list of unobservable tracks by deleting the unobservable tracks with a track quality value less than a third track quality threshold.

The method can comprise moving a remaining unobservable track to the list of confirmed tracks if the remaining unobservable track has a track quality value greater than a second track quality threshold and measurement association statistics that indicate a number of new associations greater than or equal to na where na is an integer.

The can comprise predicting the track quality value at a future time step P(k+1|k) given a track quality value at a current time step by multiplying a probability of a target existing for the track with the track quality value after an update at the current time step.

When the track is associated with a measurement at a future time step, the method can comprise calculating a track quality value P(k+1|k+1) by calculating a first sum by adding a likelihood that the target corresponding to the track exists and the associated measurement is from the target with a likelihood that the target exists and the associated measurement is a false alarm, calculating a second sum by adding the first sum with a likelihood that the target does not exist and the associated measurement is a false alarm, and dividing the first sum by the second sum.

For instance, when the track is associated with a measurement at a future time step, the method can comprise calculating a track quality value P(k+1|k+1) according to:

$$P(k+1|k+1) = \frac{1 - \pi_d^1(1 - \Lambda(k+1))}{1 - \pi_d^1(1 - \Lambda(k+1))P(k+1|k)} P(k+1|k)$$

where $\pi_d^1$ is a total detection probability inside a detection gate for the target, $$\Lambda(k+1) = \frac{f(z(k+1) | x(k+1|k))}{f(z(k+1) | \varnothing)},$$

$f(z(k+1)|x(k+1|k))$ is a likelihood of a measurement $z(k+1)$ given a predicted position of the target $x(k+1|k)$, $f(z(k+1)|\Phi)$ is a density of false alarm at $z(k+1)$ and k is the current time step.

When the track is not associated with a measurement at a future time step, the method can comprise calculating a track quality value $P(k+1|k+1)$ by calculating a first sum by adding a likelihood that the target corresponding to the track exists and it is not detected with a likelihood that the target does not exist, and dividing the likelihood that the target corresponding to the track exists by the first sum.

For instance, when the track is not associated with a measurement at a future time step, the method can comprise calculating a track quality value $P(k+1|k+1)$ according to:

$$P(k+1|k+1) = \frac{1-\pi_d^2}{1-\pi_d^2 P(k+1|k)} P(k+1|k)$$

where $\pi_d^2$ is a total detection probability inside the detection gate.

In another aspect, at least one embodiment described herein provides a computer readable medium for use in tracking targets, the computer readable medium comprising program code executable by a processor for implementing the method described above.

In another aspect, at least one embodiment described herein provides a radar system comprising hardware configured to transmit radar pulses, receive reflected radar pulses, and process the reflected radar pulses to provide pre-processed radar data; circuitry configured to process the pre-processed radar data to detect targets and generate plots of the detected targets; and a tracking module configured to receive the plots and generate tracks belonging to several track lists. For a given track, the tracking module is configured to associate a measurement with the track and generate measurement association statistics, generate and update a track quality value for the track, and determine which track list the track belongs to based on the track quality value and the measurement association statistics of the track.

BRIEF DESCRIPTION OF THE DRAWINGS

For a better understanding of the various embodiments described herein and to show more clearly how they may be carried into effect, reference will now be made, by way of example only, to the accompanying drawings in which:

FIG. 1 is a block diagram of an exemplary embodiment of a radar system;

FIG. 2 is a block diagram of an exemplary embodiment of a tracking module for use in the radar system of FIG. 1;

DESCRIPTION OF THE EMBODIMENTS

Figure 3:
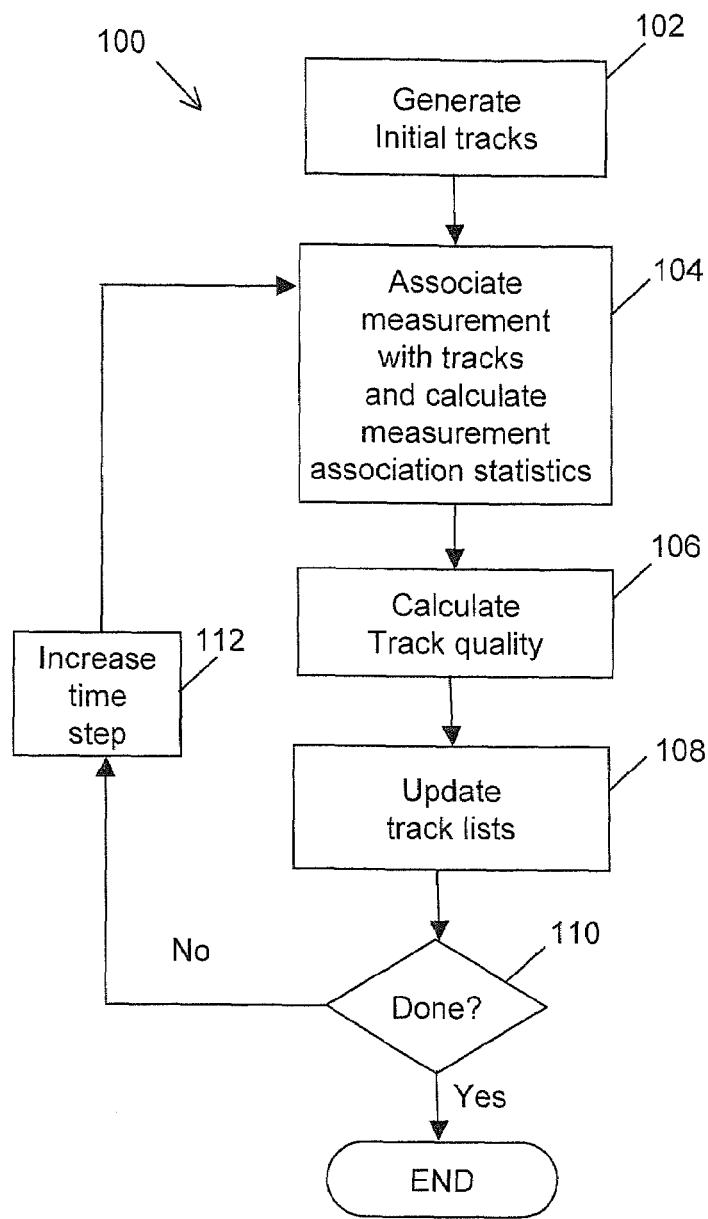
FIG. 3 is a block diagram of a Markov model that can be used for track existence and track quality measures.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Referring now to FIG. 1, shown therein is a block diagram of an exemplary embodiment of a radar system 10. The radar system 10 includes a controller 12, an antenna 14, a duplexer 16, a transmitter 18 and a receiver 20. The radar system 10 further includes radar data processing module 22, a detection module 24, a plot extraction module 26, a tracking module 28, a classification module 30 and an output device 32. In alternative embodiments, the radar system 10 may have a different layout or configuration, including different components, as is commonly known by those skilled in the art. For example, the classification module 30 may be additionally, or optionally, connected to at least one of the detection module 24 and the plot extraction module 26 to classify detected targets. This allows target classification to be done at various stages of target tracking including during or after detection, plot extraction or track formation. In alternative embodiments, there may also be an input module (not shown) that can be used to provide an additional level of control to the radar system 10. Also, the system can employ separate transmit and receive antenna (in which case the duplexer may not be required).

It should be appreciated that as used herein, the term "module" encompasses elements which may be implemented in either hardware (e.g. circuits, circuit elements and circuit components), software (e.g. computer coded being executed by a processor), and/or firmware or which may be implemented with any combination of hardware, software and/or firmware.

The controller 12 controls the activity of the radar system 10 and although connections are shown only to the transmitter 18 and the receiver 20, it is understood that the controller 12 can provide control signals to other components of the radar system 10. In general, the controller 12 provides control signals to the transmitter 18 for generating radar pulses to be transmitted via the antenna 14. The controller 12 also provides control signals to the receiver 20 for receiving return radar signals due to reflections of the transmitted radar pulses. The controller 12 can also control the duplexer 16 to allow either the transmitter 18 or the receiver 20 to be connected to the antenna 14 for transmitting or receiving signals. The controller 12 can then direct the activities of the remaining components of the radar system 10 to process the received return radar signals and provide information on any detected targets. It should be appreciated that although the controller 12 is depicted as an entity separated from the transmitter and receiver, in some systems the circuits, which provide the controller function are provided as part of the transmitter and/or receiver and timing and control signals are directly coupled between the transmitter and receiver.

The radar system 10 can employ any suitable type of antenna 14, duplexer 16, and transmitter 18 known to those skilled in the art. The antenna 14 can be a scanning antenna, a phased array antenna, or any other suitable antenna. The transmitter 18 can be a solid-state transmitter, a tube transmitter, or any other suitable transmitter. Various waveforms can be used for generating the transmitted radar pulses such as simple unmodulated waveforms, modulated complex waveforms such as nonlinear FM waveforms as well as other suitable waveforms transmitted in a simplex frequency, dual frequency or other suitable fashion as is commonly known by those skilled in the art. A variable pulse repetition frequency (PRF) may also be used across different coherent processing intervals (CPIs) to combat the blind speed problem. However, a constant PRF across different CPIs can also be used.

After the radar pulses are transmitted by the transmitter 18, the return radar signals (i.e. reflections of the transmitted radar pulses) are received by the antenna 14 and processed by the receiver 20. The receiver 20 typically includes analog and digital circuitry, such as one or more filters, amplifiers, and mixers, and an analog to digital converter. These elements perform filtering, amplification, down-conversion (i.e. demodulation to a lower frequency band) and provide pre-processed digital radar data as is commonly known by those skilled in the art. Filtering removes extraneous unwanted signals in the return radar signals. In some cases, heterodyning can be used to demodulate the filtered data from the radio frequency (RF) band to an intermediate frequency (IF) band where analog to digital conversion can take place.

The radar data processing module 22 is typically implemented using a digital signal processor, as can several of the other components shown in FIG. 1. The radar data processing module 22 further processes the pre-processed digital radar data to generally provide range-Doppler-azimuth radar data. The processing performed by the radar data processing module 22 depends upon the hardware associated with the radar system 10. Generally, the radar data processing module 22 can perform demodulation to the baseband, low-pass filtering and downsampling. In one exemplary implementation, the radar data processing module 22 performs matched filtering by employing one or more matched filters that have a transfer function or impulse response that is matched to the transmitted radar pulses. The data from the matched filter(s) is then separated into CPIs for analysis in which the data is range-aligned and beamformed to provide the range-azimuth data. The range information in the range-azimuth data provides an estimate of a possible target's distance from the radar system 10. The azimuth information in the range-azimuth data provides an estimate of the angle of the possible target's location with respect to the center of the antenna 14. The radar data processing module 22 can then apply Doppler filtering to the range-azimuth data to produce range-Doppler-azimuth data. The Doppler information in the range-Doppler-azimuth data provides an estimate of a possible target's radial velocity by measuring the possible target's Doppler shift, which is related to the change in frequency content of a given radar pulse that is reflected by the possible target with respect to the original frequency content of the given radar pulse. Those skilled in the art are generally familiar with the processing performed by the radar data processing module 22, the order in which the different stages of the processing can be performed, as well as how these different stages of processing can be implemented. It may not be necessary to perform each of these stages of processing, since one or more of these operations may be performed by different modules to enhance performance, e.g. the detection module 24 can implement a certain method to enhance detection. In other words, the radar data processing module 22 processes the pre-processed radar data to provide radar data that is typically some combination of range, azimuth and Doppler data.

The detection module 24 then locates candidate targets from the radar data provided by the radar data processing module 22. Various techniques can be used for detection as is commonly known by those skilled in the art. For instance, various types of constant false alarm rate (CFAR) techniques can be used. Further noise reduction may be performed by the detection module 24 to enhance detection, which can include the application of clutter maps to reduce the effect of clutter. In at least some cases, one or a combination of binary integration and video integration can also be used. Second time around target suppression can also be used.

The plot extraction module 26 receives and combines the candidate targets to form plots through a process known as plot extraction. The plot extraction module 26 filters the candidate targets to reject all of those candidate targets that do not conform to the certain values that are expected for certain properties of a particular type of target such as, but not limited to, aircraft targets.

The tracking module 28 receives the plots (in the form of a stream of digital bits) and generates tracks by accounting for the temporal variation of measurement information for candidate targets for a sequence of plots. More specifically, the tracking module 28 analyzes a sequence of plots and associates successive detections of a candidate target to form a track for the candidate target. Accordingly, the tracking module 28 determines the movement of the candidate targets through a given surveillance area. An exemplary embodiment of the tracking module 28 is described in more detail below.

The classification module 30 receives the tracks generated by the tracking module 28 and analyzes the tracks by measuring values for certain features of the tracks in order to classify the tracks as belonging to various different categories such as aircraft, birds, ground and weather clutter, environmental or geographical interference, etc. Another classifier may be trained for particular aircraft or non-aircraft targets and applied to the output of the classification module 30 to extract particular targets from aircraft or non-aircraft outputs. For instance, the non-aircraft class can be expanded to include birds, windmills, AP, etc. The aircraft class can be expanded to include helicopters, unmanned aerial vehicles (UAV), light aircrafts, etc. Alternatively, the classification module 30 may be trained to identify each of these subclasses of the aircraft and non-aircraft classes.

The output device 32 can provide information on the targets that are being tracked by the radar system 10. The output device 30 can be a monitor, a printer or other suitable output means. The output device 32 can receive classified tracks from the classification module 30 and provide output information on the classified tracks. In other embodiments, the output device 32 can receive information from other components of the radar system 10 and output this information.

The tracking module and processing performed thereby will be described in detail below in conjunction with FIGS. 2-9D. Briefly, however, the tracking module 28 uses an assignment-based method for data association (i.e. associating measurements to tracks) and calculates a track quality measure for the tracks that is used in track maintenance. The tracking module 28 incorporates measurement-to-track association likelihoods in the track quality measure by considering the possible detection events in whether or not the corresponding track is updated at the current time step. Generally, the likelihoods incorporate the target detection probability for a given sensor-target geometry and a corresponding false alarm density. In general, measurement-to-track association likelihood, and hence the track quality, is relatively small for false tracks compared to true tracks, and therefore aids in discriminating true tracks from false tracks.

The tracking module 28 also uses various rules for separating tracks into various lists, moving tracks between these lists, and terminating tracks from these lists. These rules are based, at least in part, on the track quality of the tracks, and measurement association statistics, which can include a length of no measurement association sequence and a total number of updates. These are described in further detail below. Each of the track lists can be updated separately.

Generally, the tracking module 28 determines that track quality is higher if the track is more frequently associated with measurements and if it has higher measurement association likelihood values, which are relatively high compared with measurement association likelihood values of other tracks. The tracking module 28 can be configured to confirm a track with a higher track quality faster, and to retain such a track longer when there are no measurements that are associated with the track over a number of successive scans (i.e. successive plots). Conversely, the tracking module 28 can use a stricter track to measurement association criteria for tracks that have not been updated in the recent past; these tracks are referred to as unobservable tracks. The main difficulty with retaining an unobservable track is that its region of uncertainty increases as the sampling time increases. This may lead to associations of an unobservable track with measurements from the other targets and/or false measurements. To avoid such a situation, tracks with a high value of track quality, which have not been associated with a measurement for more than $n_{na}$ scans, are moved to the group of unobservable tracks. The tracks in this list are given lower precedence than confirmed tracks. However, an unobservable track can be moved back to the set of confirmed tracks if it is associated with $n_a$ measurements after it was first moved to the list of unobservable tracks and maintained a certain level of track quality while it was in the list of unobservable tracks.

To further address the issue of associating measurements from other targets and/or false measurements with a given track, the tracking module 28 groups tracks into different lists and associates them with measurements in a particular order. The tracks are grouped into the different lists based upon their track quality, and measurement association statistics (i.e. length of no measurement association sequence and total number of updates). The lists include a list of initial tracks, a list of confirmed tracks and a list of unobservable tracks. The confirmed tracks are associated with measurements first. Next, the unobservable tracks, which are typically tracks having a long sequence of no detections, but are still retained, are associated with the remaining measurements. Finally, the initial tracks are associated with the remaining measurements. To reduce the possibility of false measurement associations with unobservable tracks, the associations can be made only after the unobservable track is associated with a certain number of measurements.

Referring now to FIG. 2, shown therein is a block diagram of an exemplary embodiment of the tracking module 28. The tracking module 28 includes a track initiator 50, a track association module 52, a track quality module 54 and a track list update module 56. The track initiator 50 receives the plot information of candidate targets from the plot extraction module 26 and generates preliminary tracks. Initially, all tracks can be placed in the list of initial tracks. The track association module 52 associates measurements to each of these tracks and generates the measurement association statistics. The measurement association statistics include information related on the association of measurements to a particular track. For instance, for a given track, the measurement association statistics can include the number of measurement associations for the track, the length of no associations for a given past number of time steps (i.e. no associations for a consecutive number of past time steps), and the like. The number of consecutive no associations is calculated until the track is next associated with a measurement or the track is deleted. The track quality module 54 calculates the track quality values for the tracks. The track list update module 56 then updates each list of tracks by deciding whether each track should be kept within its present list or moved to another list or dropped altogether. The tracking module 28 can provide each list of tracks along with associated information to the classification module 30. Alternatively, the tracking module 28 may provide only the list of confirmed tracks to the classification module 30.

Referring now to FIG. 3, shown therein is a flowchart diagram of an exemplary embodiment of a track generation method 100. At step 102, the tracking module 28 has just begun operation and initial tracks are generated. A given initial track is generated by connecting measurements of the same candidate target for successive plots that are provided by the plot extraction module 26. These initial tracks can be generated to have a certain number of points, which is a tuned value depending upon performance requirements such as false track rate, the time needed to initialize a track, etc. The number of points required can also be decided by striking a balance between false track confirmation and mis-detection of tracks. At step 104, the measurements are associated for each track and the measurement association statistics are calculated. The measurement information can include the range, azimuth, Doppler, and target amplitude information for a possible target. Other types of information can be incorporated into the measurement information as is commonly known by those skilled in the art. At step 106, the track quality for each track is calculated. At step 108, the track lists are updated by moving tracks between the various track lists if needed. At step 110, if tracking is no longer required, then the method 100 ends; otherwise the time step is increased at step 112, and the method 100 goes to step 104.

Figure 4:
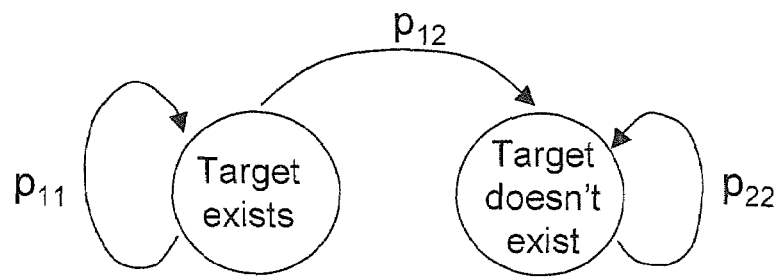
FIG. 4 is a flowchart diagram of an exemplary embodiment of a track generation method.

For a track, the track quality is defined as the probability that a target corresponding to the track exists. The target corresponding to the track comes into existence at a particular time and it ceases to exist at a random time after its birth. The corresponding Markov chain modeling this situation is shown in FIG. 4. It is assumed that if a target exists it is detectable, although the probability of detection may vary from target to target. As shown in FIG. 4, $p_{11}$ is the probability that the target stays in the "exists" state during a single time step, $p_{12}$ is the transition probability of a transition from the "target exists" state to the "target does not exist" state in a single time step, and $p_{22}$ is equal to 1 which means that if the target is in the "target does not exists" state then it remains there.

If the variable P(k|k) denotes the track quality at the current time step k after an update (i.e. after it is determined whether a measurement is associated with the track), then following the above model, the predicted track quality at time step k+1 is given by:

$$P(k+1|k) = p_{11} P(k|k) \quad (1)$$

The probability value $p_{11}$ is a constant that is related to performance requirements that are specified for the tracking module 28. Also, this constant is tuned before operation depending upon the site where the radar system 10 is installed using techniques that are commonly known to those skilled in the art. The value P(k|k) is related to sensor accuracy and other sensor related parameters and can be initialized by using the initial probability of target existence equation which is known to those skilled in the art. At the update stage, two events are possible for the track:

1) the track is associated with a measurement at time step k+1 (event $A_1$) or
2) the track is not associated with a measurement at time step k+1 (event $A_2$).

If event $A_1$ is observed at time step k+1, then it is assumed that there are three possibilities to consider:

i) the target corresponding to the track exists and the associated measurement is from the target (event $A_{11}$),
ii) the target exists but the associated measurement is a false alarm (event $A_{12}$), and
iii) the target does not exist and the associated measurement is a false alarm (event $A_{13}$).

The above events $A_{11}, A_{12}, A_{13}$ are exclusive and are assumed to be exhaustive. For convenience, the other possible events, which consider that the associated measurement is from another target, are not considered.

Since an assignment based track maintenance method assigns a measurement to a track that is the global nearest neighbor (GNN) of the track, the distance between a track and its GNN measurement defines the detection gate in the case of event $A_1$. Multiple hypothesis or multiple frame algorithms can be used to further improve the tracking performance. Alternatively, the Suboptimal Nearest Neighbor (SNN) method can be used. This method is easier to implement than the GNN and it has lower computational complexity. However, it may cause performance degradation, particularly, in dense target scenarios. The total detection probability inside this gate is represented by $\pi_d^1$ (i.e. assuming event $A_1$). Note that the total target detection probability is the product of the probability of detection and the probability that the detection is inside the gate. If $f(z(k+1)|x(k+1|k))$ denotes the likelihood of the measurement z(k+1) given the predicted position of the target x(k+1|k), then the likelihood of event $A_{11}$ (given event $A_1$) is given by:

$$l(A_{11}) = \pi_d^1 f(z(k+1)|x(k+1|k)) P(k+1|k) \quad (2)$$

Next the event $A_{12}$ is considered. The likelihood that the track exists and the measurement is a false alarm is given by:

$$l(A_{12}) = (1-\pi_d^1) f(z(k+1)|\Phi) P(k+1|k) \quad (3)$$

where $f(z(k+1|\Phi)$ is the density of false alarm at z(k+1).

Following the above discussion, the likelihood of event $A_{13}$ is given by:

$$l(A_{13}) = f(z(k+1)|\Phi)(1-P(k+1|k)) \quad (4)$$

Ideally, the set of events $A_{11}, A_{12}, A_{13}$ is an exhaustive set given event $A_1$. In some practical embodiment, however, this may not be true—i.e. the set of events $A_{11}, A_{12}, A_{13}$ may not be an exhaustive set given event $A_1$. It should be appreciated, however, that the more complete the set of events, the more accurate the computation of the likelihood value and other values. Since the existence of the target is supported by events $A_{11}$ and $A_{12}$, the updated track quality for event $A_1$ is given by equations 5 and 6 for event $A_1$.

$$P(k+1|k+1) = \frac{l(A_{11}) + l(A_{12})}{l(A_{11}) + l(A_{12}) + l(A_{13})} \quad (5)$$

$$= \frac{1 - \pi_d^1(1 - \Lambda(k+1))}{1 - \pi_d^1(1 - \Lambda(k+1))P(k+1|k)} P(k+1|k)$$

$$\Lambda(k+1) = \frac{f(z(k+1)|x(k+1|k))}{f(z(k+1)|\varnothing)} \quad (6)$$

The parameter $\pi_d^1$ is a constant that depends upon performance specifications and the location of the radar system 10; those skilled in the art know how to calculate a value for this parameter. There are different ways to calculate the parameters $f(z(k+1)|x(k+1|k))$ and $f(z(k+1)|\Phi)$. The first parameter can be obtained from tracking filter computed track update error statistics and measurement error statistics. The second quantity is the density of false plots and can be computed from measurements that are not associated with tracks in any stage.

If the track is not associated with a measurement (event $A_2$), i.e., there are no measurements in the detection gate, the track quality is updated as follows. Note that in this case it is possible that there is a measurement in the detection gate that is associated with another track. This possibility is neglected for convenience. In the case of event $A_2$, two possibilities can be considered:

i) the target corresponding to the track exists and it is not detected (event $A_{21}$), and
ii) the target does not exist (event $A_{22}$).

The first event can occur if there is no detection from the target and no false alarm inside the detection gate. The total target detection probability inside the detection gate is represented by $\pi_d^2$. Furthermore, the probability of no false alarm in gate is represented by $\pi_{100}$. The likelihood of event $A_{21}$ is then given by:

$$l(A_{21}) = (1-\pi_d^2)\pi_{100} P(k+1|k) \quad (7)$$

Similarly the likelihood of event $A_{22}$ is given by:

$$l(A_{22}) = \pi_{\phi 0}(1-P(k+1|k)) \quad (8)$$

Considering that track existence is supported by the first event only, the updated track quality for event $A_2$ is given by:

$$P(k+1|k+1) = \frac{l(A_{21})}{l(A_{21}) + l(A_{22})} \quad (9)$$

$$= \frac{1-\pi_d^2}{1-\pi_d^2 P(k+1|k)} P(k+1|k)$$

The parameter $\pi_d^2$ is a constant that depends upon performance specifications and the location of the radar system 10; those skilled in the art know how to calculate a value for this parameter.

The track quality module 54 can calculate the track quality values for events $A_1$ and $A_2$ according to equations 5 or 6 and 9 respectively. As can be seen, for both events $A_1$ and $A_2$ the track quality is based upon target detection (includes the probability of existence of a target for a track), and measurement association for the track and the corresponding target.

Figure 5:
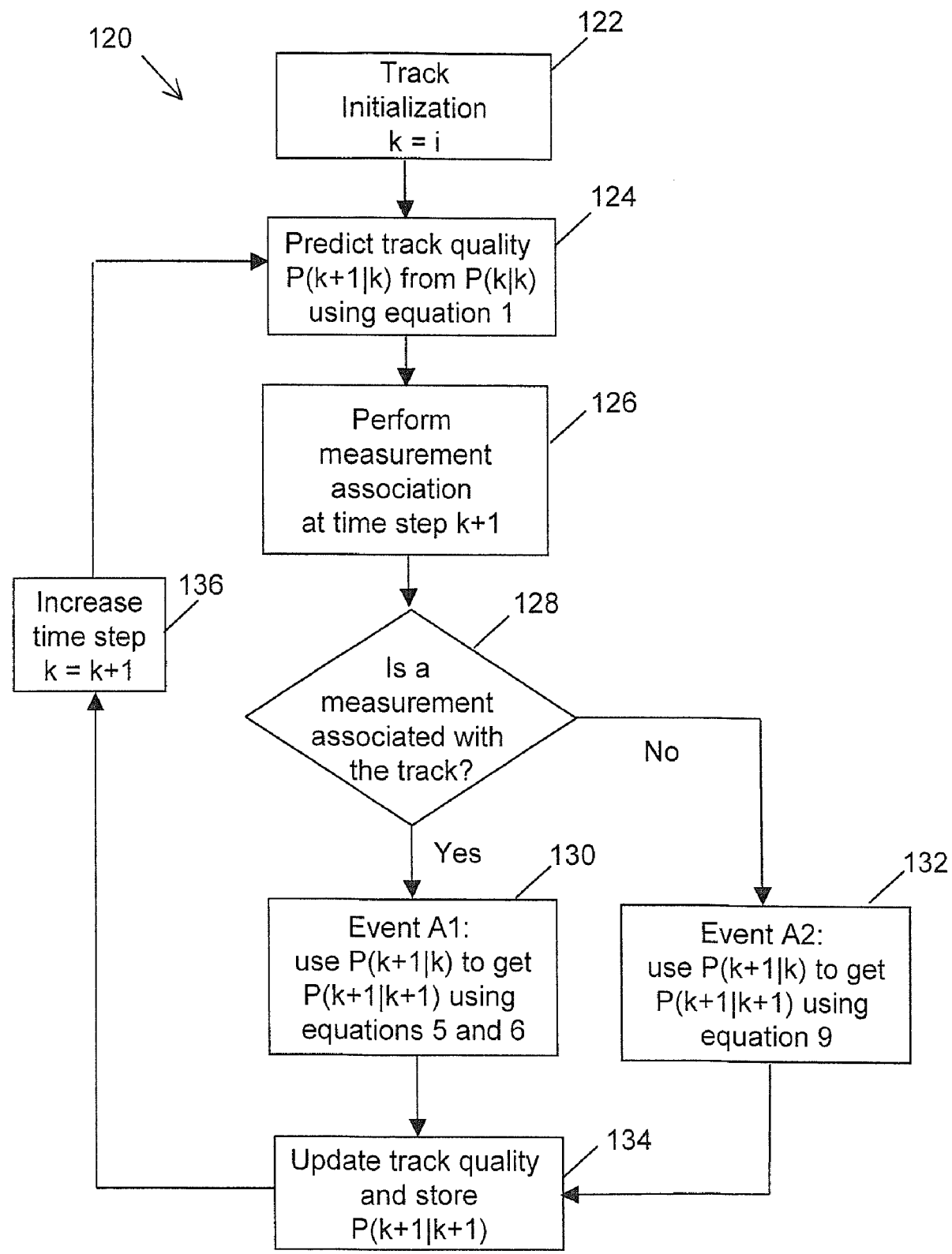
FIG. 5 is a flowchart diagram of an exemplary embodiment of a track quality calculation method.

Referring now to FIG. 5, shown therein is a flowchart diagram of an exemplary embodiment of a track quality calculation method 120 for calculating the track quality for a track. At step 120, the track is initialized based on a certain number of time steps i (i.e. measurement associations) using a suitable track initialization method (described below). At step 124, the track quality P(k+1|k) is predicted from P(k|k) using equation 1. At step 126, the measurement association occurs for time step k+1. At step 128, it is determined whether the track was associated with a measurement. If so, the method 120 goes to step 130 where the track quality P(k+1|k+1) is calculated using P(k+1|k) and equations 5 and 6. Otherwise, the method 120 goes to step 132 where the track quality P(k+1|k+1) is calculated using P(k+1|k) and equation 9. At step 134, the track quality P(k+1|k+1) for the track is stored. At step 136, the time step is incremented and the method 120 goes to step 124. This cycle repeats until the track is terminated. This cycle can be repeated for each track.

Figure 6:
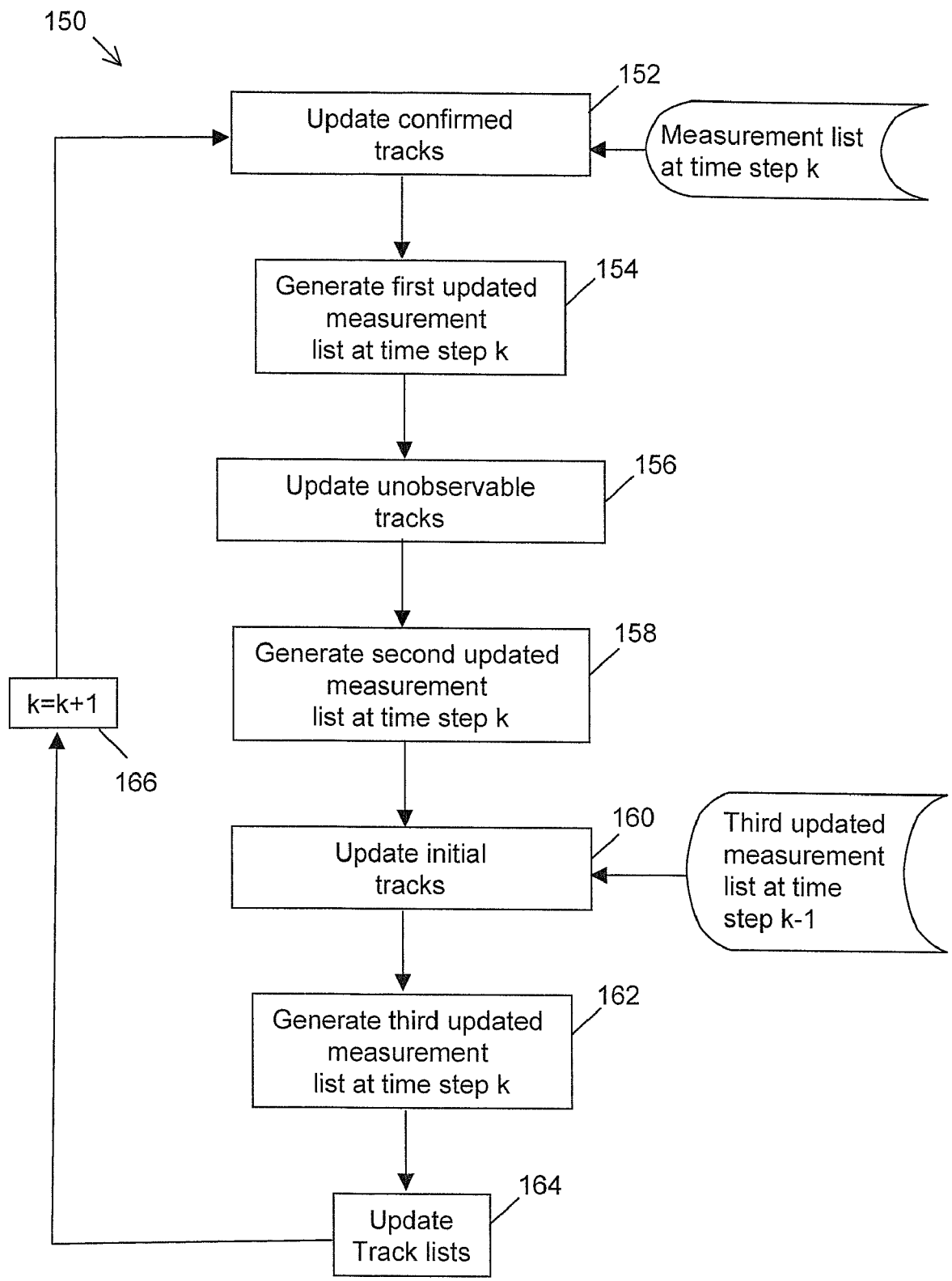
FIG. 6 is a flowchart diagram of an exemplary embodiment of a track-measurement association generation method.

Referring now to FIG. 6, shown therein is a flowchart diagram of an exemplary embodiment of a track-measurement association method 150. The current tracks are generally divided into three different categories: initial tracks, confirmed tracks, and unobservable tracks. The tracking module 28 implements a multilayer association technique in the sense that higher layered tracks (i.e. confirmed tracks) are tracks with a higher priority and are associated with measurements first so that these tracks have a better chance to survive. The track quality initially sets a track's priority level. However, a track's layer or priority level can change over time due to updated track quality and other statistics. The track quality will be updated based on events $A_1$ and $A_2$. The preliminary tracks that are not yet confirmed are denoted as initial tracks. Accordingly, when the tracking module 28 first starts operating and generates the preliminary tracks, these tracks are grouped with the list of initial tracks. After confirmation, a track is denoted as a confirmed track and is grouped with the list of confirmed tracks. The list of unobservable tracks is as described before and a track is grouped in this list based on certain rules as will be described.

At step 152, the confirmed tracks are updated using the measurements from the current measurement list (i.e. at time step k). This is a new measurement list based upon the current radar scan. A confirmed track is updated by associating one of the measurements from the measurement list to the track. This measurement association can be done based on the auction method (i.e. 2-D assignment). Alternatively, depending upon operational circumstances and performance criteria, other types of measurement association methods may be used such as, but not limited to, the Hungarian, Munkres, Jonker-Volgenant-Castanon (JVC), RELAX II, signature methods. These methods are known to those skilled in the art. The measurement list is then updated at step 154 by removing the measurements that were associated to the confirmed tracks to produce the first updated measurement list.

At step 156, the measurements from the first updated list are then associated with the unobservable tracks. This measurement association can also be done using the auction method (i.e. 2-D assignment) or the other methods as noted above. At step 158, the first measurement list is updated by removing the measurements associated with the unobservable tracks to produce the second updated measurement list.

At step 160, the measurements from the second updated list at the current time step k and the third updated measurement list from the previous scan (at time step k−1) are associated with preliminary tracks to obtain initial tracks. A two-point track initialization method can be used in this association to obtain a new list of initial tracks. Tracks can be initialized from active and passive measurements using a number of sets of scan information. The two-point track initialization method uses two sets of scans of active measurements to initiate tracks. At step 162 the measurements associated with the initial tracks are removed from the third updated measurement list at the current time step k. This measurement list will become the "third updated measurement at time step k−1" for the next iteration of this method (i.e. at time step k+1). The current version of the third updated measurement list for the previous time step k−1 may still be retained; for instance, if N step track initialization is used, third updated measurements lists from N−1 previous time steps will be retained.

At step 164, the lists of tracks are updated, i.e. tracks can be exchanged among the sets. This can be done according to various rules as described below with reference to FIGS. 7A-C. A track state is updated only if it is associated with a measurement. The track state is a combination of all track information including target position, target speed, target strength, track quality, history, number of misses, number of updates, track layer, measurement association statistics and the like. However, the track quality and track layer (i.e. track priority) are updated for all tracks irrespective of whether it is associated with measurement or not at the current time step. At step 166, the time step is incremented and the method 150 is performed again.

Figure 7A:
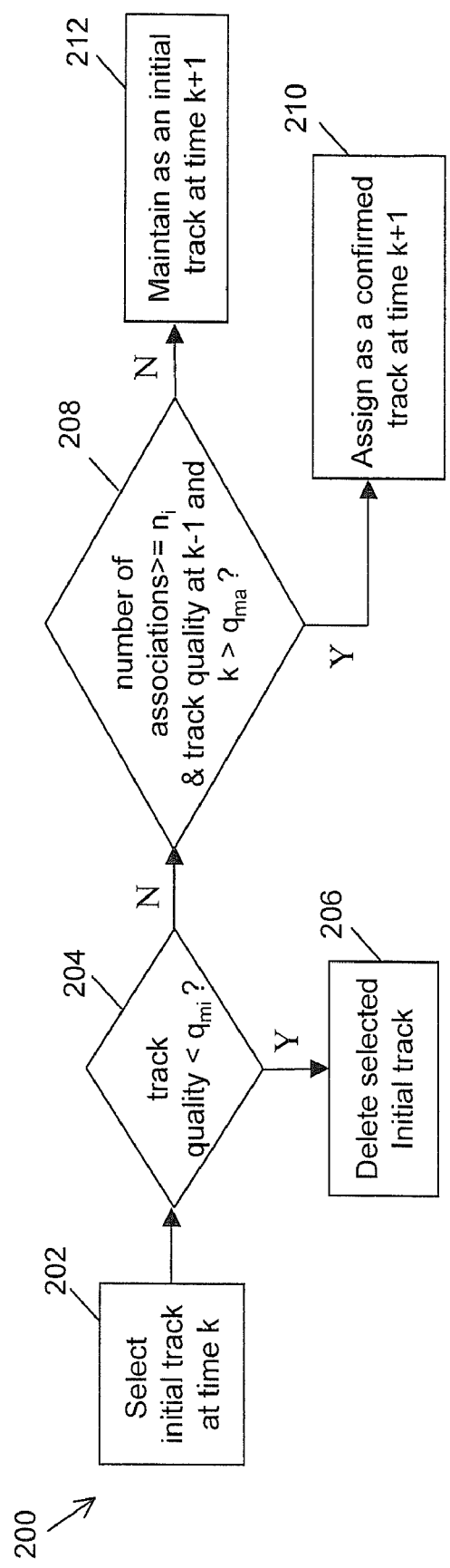
FIG. 7A is a flowchart diagram of an exemplary embodiment of a track list update method for an initial track.

Referring now to FIG. 7A, shown therein is a flowchart diagram of an exemplary embodiment of a track list update method 200 for an initial track. At step 202, an initial track is selected for the current time step k. At step 204, the track quality for this selected initial track is compared with track quality threshold $q_{mi}$. If the track quality for the selected initial track is lower than the track quality threshold $q_{mi}$, the selected initial track is removed from the list of initial tracks at step 206 and deleted. Otherwise, at step 208, it is determined whether the measurement association statistics indicate that the number of associations for the selected initial track (for the entire lifetime of the track) is greater than or equal to $n_i$, and the track quality values for the last two time steps are greater than $q_{ma}$, for the selected initial track. If both of these conditions are true, then at step 210 the selected initial track is considered to be a confirmed track and is assigned to the list of confirmed tracks for time step k+1. Otherwise, if at least one of the conditions in step 208 is not true, then at step 212 the selected initial track is maintained as an initial track and is retained in the list of initial tracks for time step k+1.

Figure 7B:
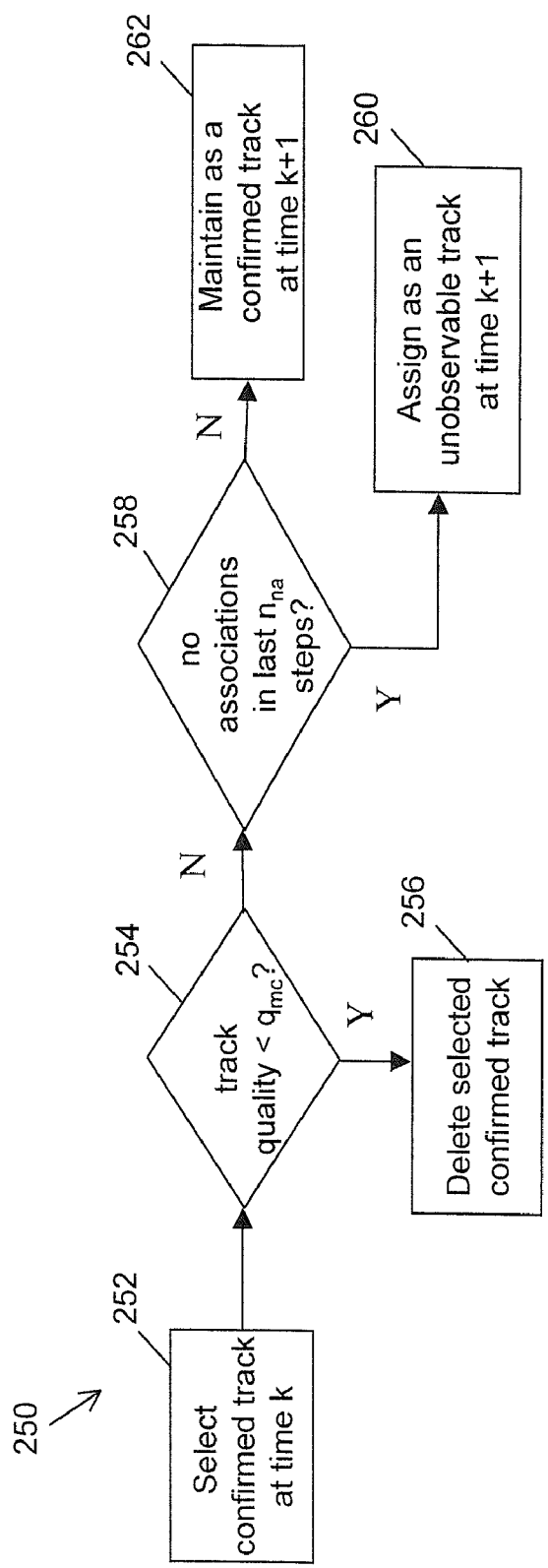
FIG. 7B is a flowchart diagram of an exemplary embodiment of a track list update method for a confirmed track.

Referring now to FIG. 7B, shown therein is a flowchart diagram of an exemplary embodiment of a track list update method 250 for a confirmed track. At step 252, a confirmed track is selected from the list of confirmed tracks for the current time step k. At step 254, the track quality of the selected confirmed track is compared to a track quality threshold $q_{mc}$. If the track quality of the selected confirmed track is smaller than the track quality threshold $q_{mc}$, then the selected confirmed track is considered to be a dead track and is deleted. Otherwise, the method 250 proceeds to step 258 at which point it is determined if the measurement association statistics for the selected confirmed track indicate that there has not been any measurement associations in the last $n_{na}$ time steps. If this is true, then at step 260 the selected confirmed track is considered to be an unobservable track and is moved to the list of unobservable tracks for time step k+1. Otherwise, at step 262, the selected confirmed track is maintained as a confirmed track and retained in the list of confirmed tracks for time step k+1.

Figure 7C:
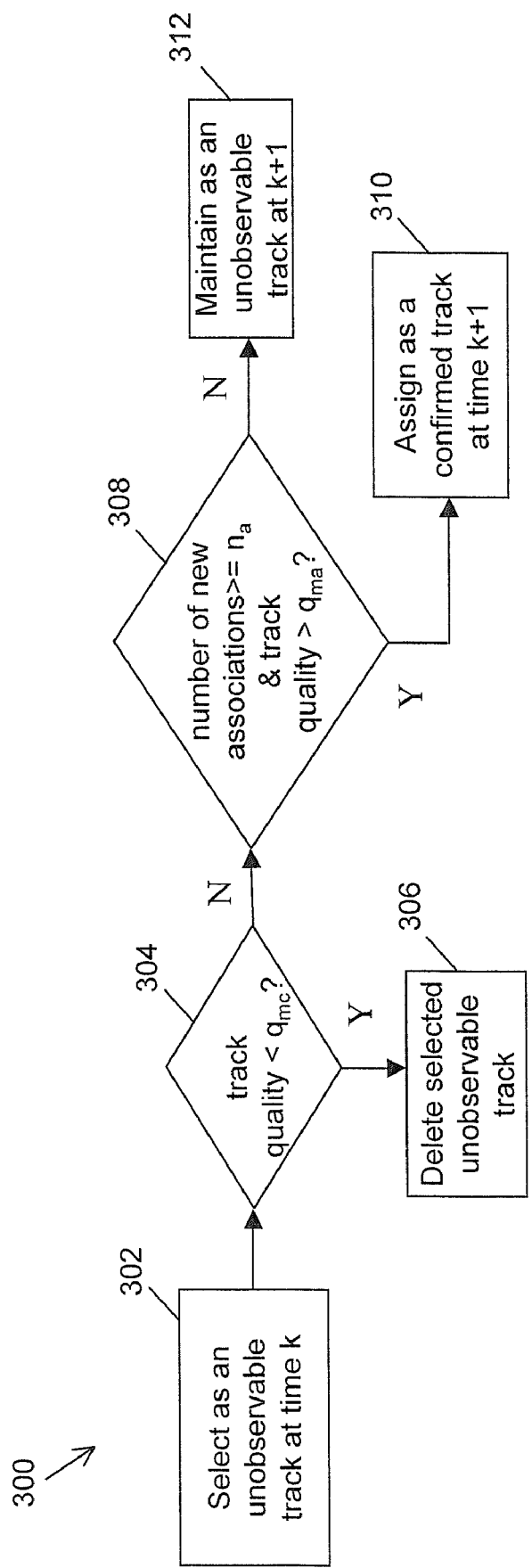
FIG. 7C is a flowchart diagram of an exemplary embodiment of a track list update method for an unobservable track.

Referring now to FIG. 7C, shown therein is a flowchart diagram of an exemplary embodiment of a track list update method 300 for an unobservable track. At step 302, an unobservable track is selected for time step k. At step 304, the track quality of the selected unobservable track is compared to the track quality threshold $q_{mc}$. If the track quality of the selected unobservable track is smaller than the track quality threshold $q_{mc}$, then the selected confirmed track is considered to be a dead track and is deleted. Otherwise, at step 308 it is determined whether the measurement association statistics for the selected unobservable track indicates that the number of new associations since this track was first denoted as an unobservable track is greater than or equal to $n_a$ and if the track quality of the selected unobservable track is greater than the track quality threshold $q_{ma}$. If both of these conditions are true, then at step 310 the selected unobservable track is considered to be a confirmed track and assigned to the list of confirmed tracks for time step k+1. If at least one of these conditions is not true, then at step 312 the selected unobservable track is maintained as such and retained in the list of unobservable tracks for time step k+1.

The performance of the tracking module 28 and a fixed logic tracker was tested on a simulated scenario and a real data set from High Frequency Surface Wave Radar (HFSWR). An Interacting Multiple Model (IMM) estimator (Bar-Shalom et al., Multitarget-Multisensor Tracking: Principles and Techniques, YBS Publishing, © 1995, pp. 453-484.), which joins two Kalman filters assuming discretized continuous-time white noise acceleration with standard deviation 0.0025 $m/s^{3/2}$ and 0.025 $m/s^{3/2}$, respectively, was used for track maintenance. The auction algorithm (2-D assignment) (Bertsekas, Linear Network Optimization: Algorithms and Codes, MIT Press, Cambridge, Mass. USA, © 1991) is used for data association. The IMM estimator and the auction algorithm are both used for the track quality based tracker and the fixed logic tracker. However, a different procedure is followed in these trackers to update their track lists. The fixed logic tracker uses measurement association statistics to perform this step. While, the tracking module 28 also uses track quality information. The original position measurements are in the form of range and azimuth angle in the presence of noise, which are converted to an (x, y) position using the standard conversion (Bar-Shalom et al., Multitarget-Multisensor Tracking: Principles and Techniques, YBS Publishing, © 1995.). As shown by Yeom et al. ("Track segment Association, Fine-step IMM and Initialization with Doppler for Improved Track Performance", IEEE Trans. on Aerospace and Electronic Systems, Vol. 40, No. 1, pp. 293-309, January, 2004.), the observed azimuth angle is used to allow a linear model for the range rate measurement. A two-point track initialization is used to obtain the initial tracks. The tracker assumes a probability of detection of 0.8 and uniformly distributed false alarm with an average 200 per scan.

A fixed logic based algorithm, in which the track confirmation and termination decisions are made solely based on the total number of measurement associations and the length of a no association sequence, is implemented to compare the performance with the quality based tracking module 28. In the fixed logic based tracker, an initial track is confirmed if it is associated with at least 5 measurements and a confirmed track is terminated if it is not detected in 10 consecutive scans.

FIGS. 8A-9D are a series of plots. The radar has a surveillance coverage by range & azimuth sector, which is not a square area. Thus, different scales among the plots on FIGS. 8A-9D are use to fully display tracks or track segments. The distances shown on the axis are distances from the radar system (i.e., the radar is the coordinate system origin).

Figure 8B:
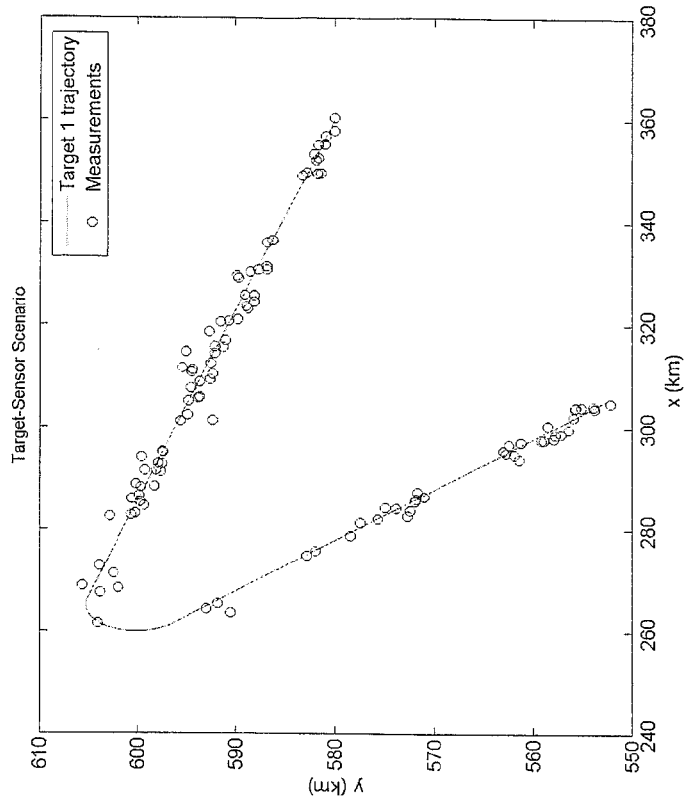
FIG. 8B is a plot of the measurements obtained corresponding to target 1 of FIG. 8A in a typical Monte Carlo (MC) run.
Figure 8A:
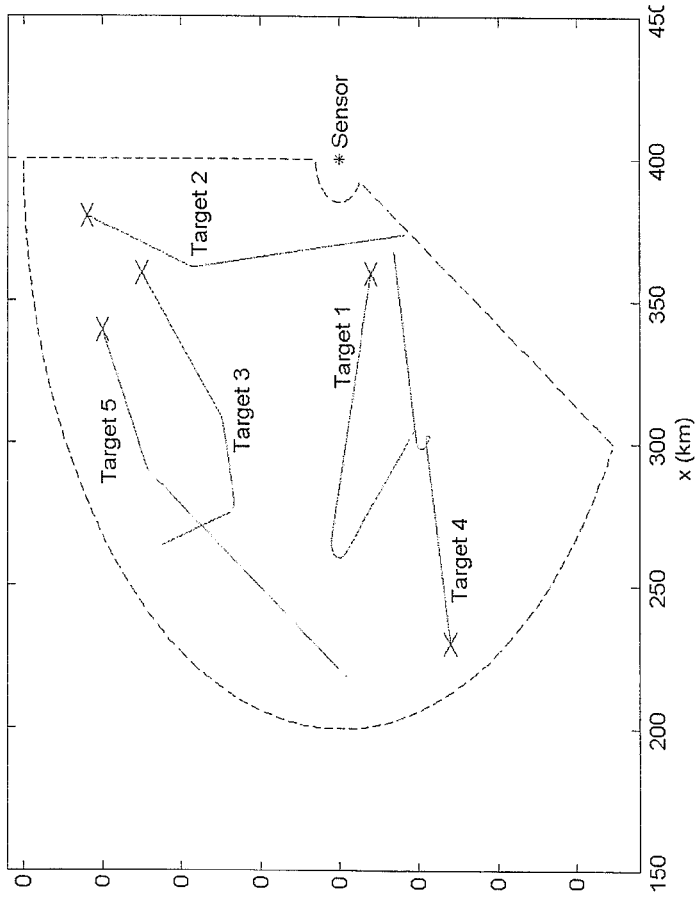
FIG. 8A is a plot of target paths, sensor location and sensor coverage for a simulated scenario in which initial target positions are denoted by the symbol 'x'.

Referring now to FIG. 8A, shown therein is a plot of target paths, sensor location and sensor coverage for a simulated exemplary scenario in which initial target positions are denoted by x. In the simulated scenario, 5 targets are considered. Each target performs at least one coordinated turn. The maximum turn rate is 0.1 degrees/s and the minimum turn rate is 0.05 degrees/s. The speed of the targets varies from 2 m/s to 10 m/s. The maximum and minimum linear accelerations are 0.017 $m/s^2$ and 0.0035 $m/s^2$, respectively. An HFSWR is simulated which measures range, azimuth angle and range rate. The minimum and maximum range of the sensor are 15 km and 200 km, respectively. The accuracies of the sensor are as follows: the range estimation error standard deviation is 1 km, the azimuth angle estimation error standard deviation is 0.01 rad and the range rate estimation error standard deviation is 0.8 m/s. The sampling interval of the sensor is 100 s. The number of false alarms corresponding to the sensor per scan is Poisson distributed with a mean of 200. The false alarms are uniformly and independently distributed in range, azimuth angle and range rate. As a result the false alarm density is higher at lower values of the range.

Real data from HFSWR radar shows that occasionally a target may not be visible for a number of scans. To include this possibility in the simulation, the detection event is considered to be the result of two processes. At each scan, the first process can start a sequence of missed detections corresponding to a target with a probability of 0.05. The length of each missed detection sequence is a Poisson random variable with an average of 8. In any scan, if a missed detection sequence is not active for a particular target it can still be missed with probability of 0.15. FIG. 8B shows a plot of the measurements obtained corresponding to target 1 in a typical Monte Carlo (MC) run. Multiple missed detection sequences can be observed in this figure.

Figure 8D:
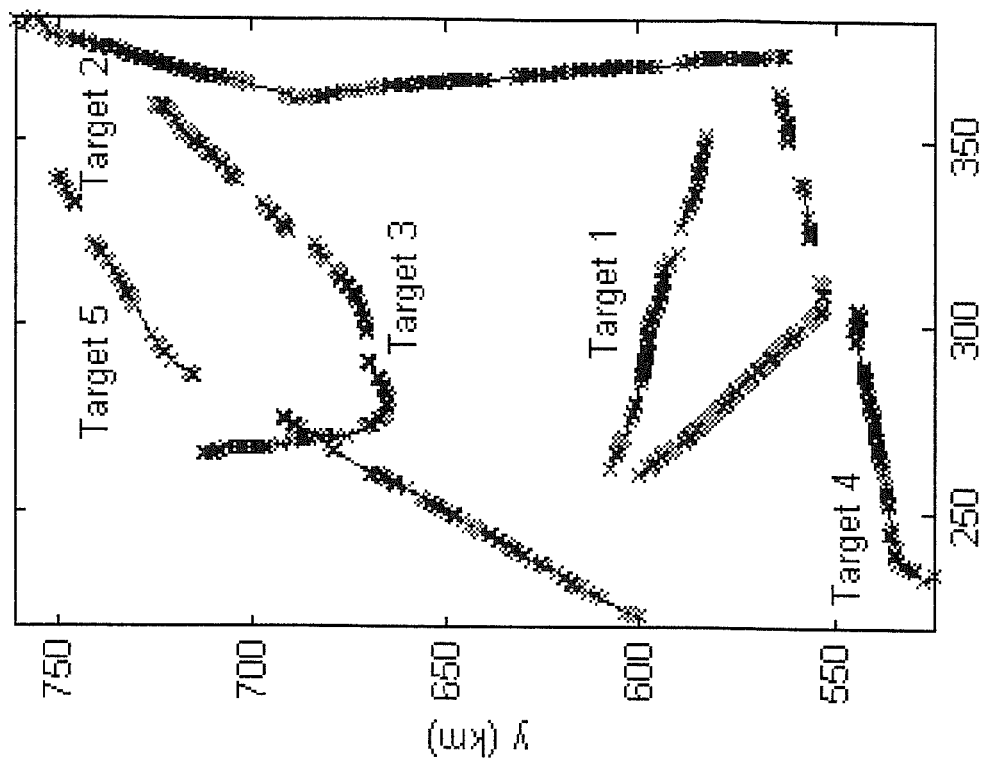
FIGS. 8C and 8D are plots of the tracks obtained by a track-quality based tracker (described herein) and a fixed logic based tracker, respectively, in a typical MC run.
Figure 8C:
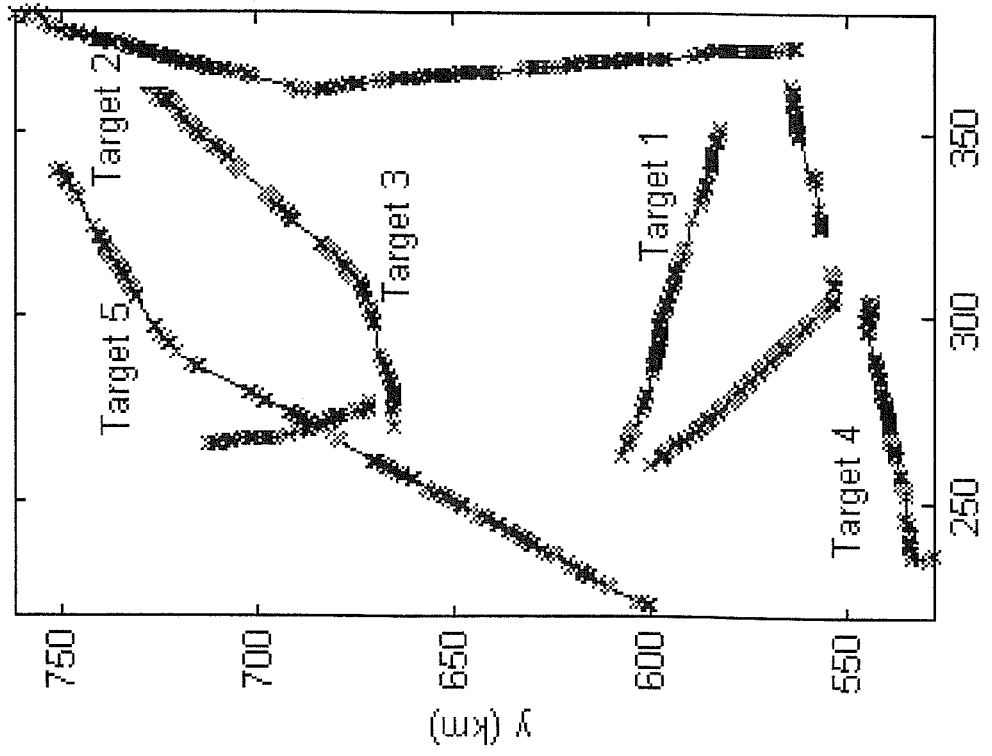

Referring now to FIGS. 8C and 8D, shown therein are plots of the tracks obtained by the track-quality based tracking module 28 and the fixed logic based tracker, respectively, in a typical MC run. It can be seen that in a number of instances tracks obtained by the tracking module 28 have better continuity. The fixed logic based tracker loses tracks more often and as a result needs to restart the track more often. This results in lower RMSE performance.

Table 1 shows performance metrics for the two trackers obtained by averaging over 100 MC runs. It can be seen that the track quality-based tracking module 28 performs better in all cases. Considerable success is achieved particularly in increasing the percentage of target trajectory tracks and in reduction of the average false track lifetime. This shows that the tracking module 28 improves track continuity and at the same time decreases average false track length.

TABLE 1

100 MC run average of the performance metrics corresponding
to track quality based and fixed logic based trackers

| Method | Detection delay (min) | % of traj. tracked | Pos'n RMSE (m) | Velocity RMSE (m/s) | Avg. false track no./run | Avg. false track life (min) |
|---|---|---|---|---|---|---|
| Track Quality | 9.52 | 82.4% | 939.6 | 2.37 | 1.61 | 14.02 |
| Fixed Logic | 10.78 | 74.3% | 982.4 | 3.04 | 1.94 | 24.17 |

Figures 9A, 9B:
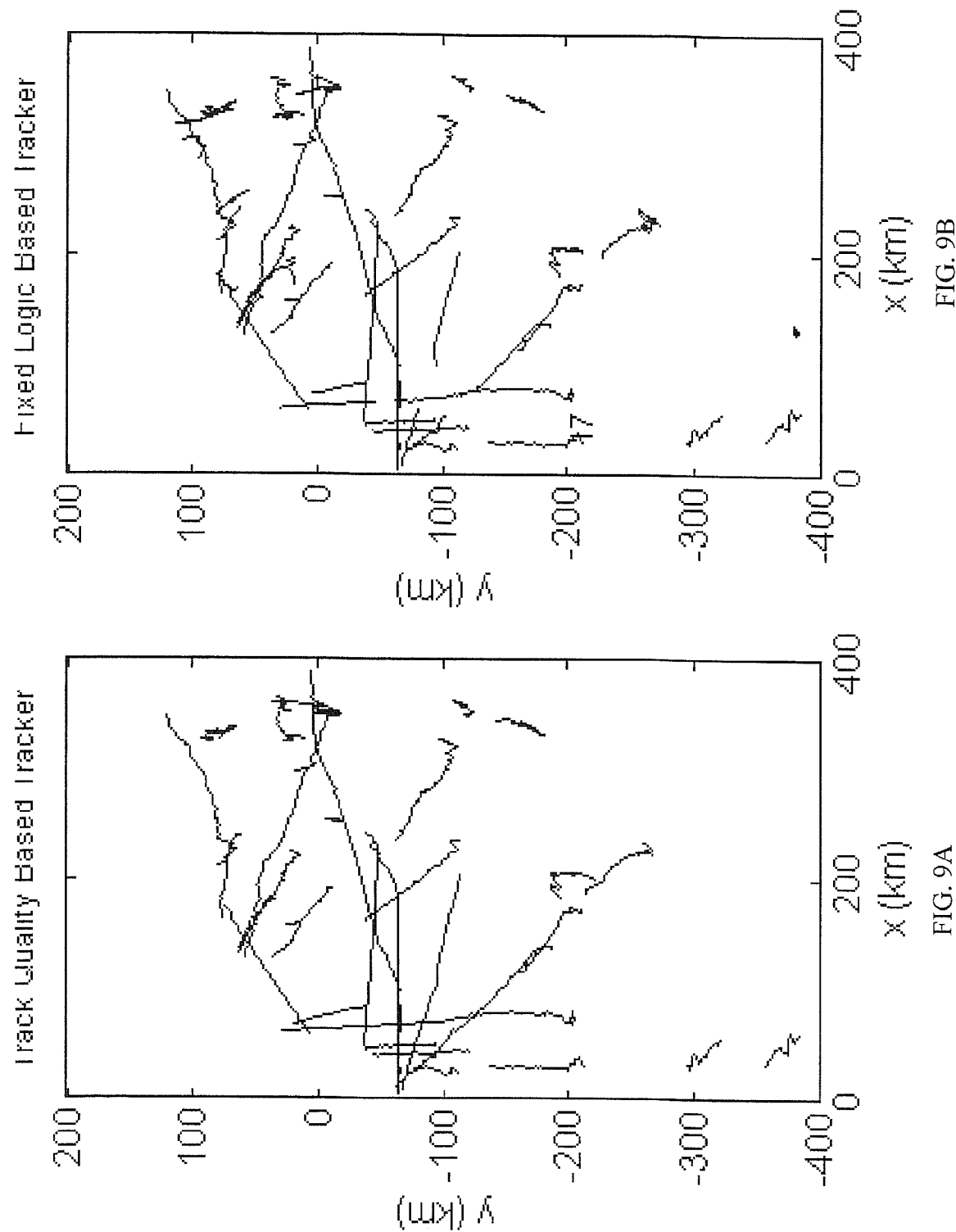
FIGS. 9A and 9B are plots of tracks obtained from real HFSWR data by a track-quality based tracker (described herein) and a fixed logic based tracker, respectively; and, FIGS. 9C and 9D are plots of tracks in a zoomed area obtained from real HFSWR data by a track-quality based tracker (described herein) and a fixed logic based tracker, respectively, in a typical MC run.
Figure 9D:
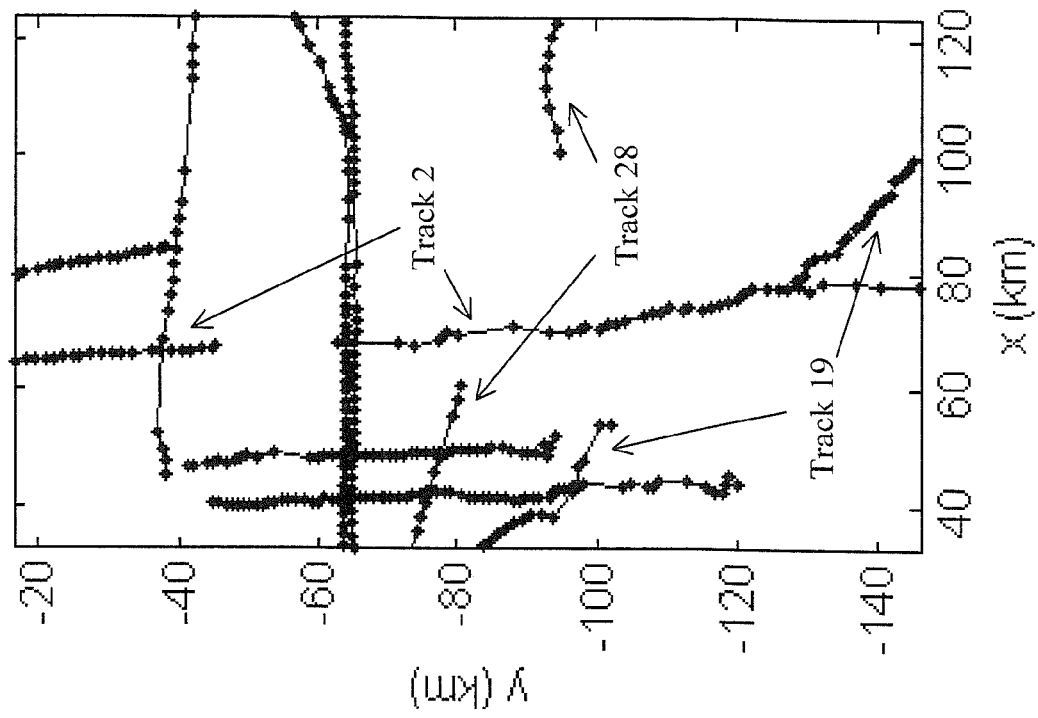
Figure 9C:
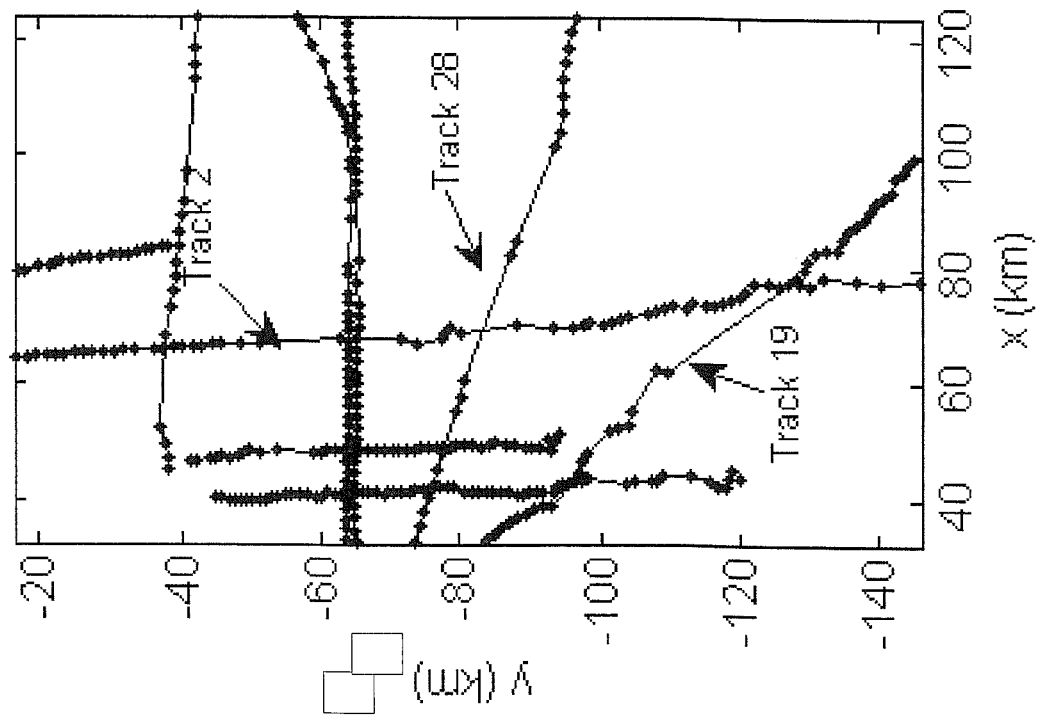

The tracking module 28 and the fixed logic based tracker are also applied to a real data set from an HFSWR. FIGS. 9A and 9B shows the tracks obtained by the tracking module 28 and the fixed logic based tracker respectively. It can be seen that the fixed logic based tracker exclusively obtains some short tracks that appear to be false tracks. FIGS. 9C and 9D zoom into a part of the surveillance region for the results obtained by the tracking module 28 and the fixed logic based tracker respectively. It can be seen that the tracks with track IDs 2, 19, and 28 obtained by the tracking module 28 are continued while the corresponding tracks obtained by the fixed logic based tracker are broken. Table 2 shows that there is significant improvement (up to 40%) in the average track-life for the tracking module 28.

TABLE 2

Comparison of the performance of track-quality based
and fixed-logic based trackers

| Data Set | Tracker | Number of Tracks | Average number of associations | Average track-life | Run-time |
|---|---|---|---|---|---|
| 1 | Track-quality based | 49 | 46.4 | 4 hr. 43 min. | 78 sec. |
|   | Fixed logic based | 57 | 40.3 | 3 hr. 58 min. | 86 sec. |
| 2 | Track-quality based | 41 | 59.1 | 5 hr. 49 min. | 43 sec. |
|   | Fixed logic based | 54 | 46.1 | 4 hr. 25 min. | 47 sec. |
| 3 | Track-quality based | 364 | 33.1 | 2 hr. 5 min. | 187 sec. |
|   | Fixed logic based | 453 | 26.7 | 1 hr. 30 min. | 132 sec. |
| 4 | Track-quality based | 313 | 32.8 | 1 hr. 49 min. | 286 sec. |
|   | Fixed logic based | 398 | 26.6 | 1 hr. 18 min. | 168 sec. |
| 5 | Track-quality based | 194 | 71.7 | 4 hr. 41 min. | 170 sec. |
|   | Fixed logic based | 246 | 56.4 | 3 hr. 34 min. | 172 sec. |

In general, the results show that the tracking module 28 achieves significant track life improvement and false track rejection over the fixed logic based tracker. The results show that the tracking module 28 can decrease the average false track length and extend the track life significantly in scenarios where the probability of track detection is low. Furthermore, the number of false tracks does not increase with the tracking module 28 even if the clutter density is high.

The elements of the radar system 10 described herein may be implemented through any means known in the art including dedicated hardware like a digital signal processor that executes computer instructions. Alternatively, discrete components such as filters, comparators, multipliers and the like may also be used. Furthermore, the functionality of certain blocks in the radar system 10 may be provided by the same structure. If computer instructions are used for any of the components of the radar system 10, they may be written in Matlab, C, C++, Labview™ or any suitable programming language embodied in a computer readable medium on a computing platform having an operating system and the associated hardware and software that is necessary to implement the functionality of these components. The computer instructions can be organized into modules or classes, as is known to those skilled in the art, that are implemented and structured according to the structure of the components described herein such as the tracking module 28.

It should be noted that values for the various thresholds and parameters used in the tracking module 28 can be affected by the location of the radar system 10. Accordingly, one method for determining values for these thresholds and parameters can be based on operating the tracking module 28 based on real data, selecting various values for these parameters and thresholds and determining which values provide the best performance. In fact, it is well known to those skilled in the art that it is a well-known practice to routinely perform site optimization to select values for thresholds and operating parameters for components of a radar system.

It should be understood that various modifications can be made to the embodiments described and illustrated herein, without departing from the embodiments, the general scope of which is defined in the appended claims.

The invention claimed is:

1. A tracking module for tracking a detected target, the tracking module comprising:
    a track association module configured to associate a measurement with a track and generating measurement association statistics for the track;
    a track quality module configured to generate and update a track quality value for a track based on a measurement-to-track association likelihood; and
    a track list update module configured to confirm and delete tracks in a track list comprising a list of confirmed tracks and a list of unobservable tracks based on the track quality value and the measurement association statistics of the tracks in this track list,
    wherein the track list update module is configured to move a confirmed track to the list of unobservable tracks if the measurement association statistics of the confirmed track indicates no measurement associations in the last $n_{na}$ time steps where $n_{na}$ is an integer, and to process the list of unobservable tracks by deleting the unobservable tracks with a track quality value less than a first track quality threshold value.

2. The tracking module of claim 1, wherein the track list further comprises a list of initial tracks.

3. The track module of claim 2, wherein the tracking module comprises a track initiator configured to generate a preliminary version of the track.

4. The tracking module of claim 3, wherein, for a current time step, the track association module is configured to associate measurements from a measurement list with the list of confirmed tracks, then the list of unobservable tracks, and then the list of initial tracks.

5. The tracking module of claim 3, wherein, for a current time step, the track association module is configured to associate measurements from a measurement list with the list of confirmed tracks and remove the associated measurements from the measurement list to generate a first updated measurement list, then associate measurements from the first updated measurement list with the list of unobservable tracks and remove the associated measurements from the first updated measurement list to generate a second updated measurement list, then associate measurements from the second updated measurement list and a third updated measurement list corresponding to a previous time step with the list of initial tracks and remove the associated measurements from the second updated measurement list to generate a third updated measurement list.

6. The tracking module of claim 3, wherein the track list update module is configured to process the list of initial tracks by deleting the initial tracks with a track quality value less than a second track quality threshold value.

7. The tracking module of claim 6, wherein the track list update module is configured to move a remaining initial track to the list of confirmed tracks if the remaining initial track has a track quality value at the current time step and a track quality value at a previous time step that are both greater than a third track quality threshold value, and measurement association statistics that indicate a number of associations greater than or equal to $n_i$ where $n_i$ is an integer.

8. The tracking module of claim 1, wherein the track list update module is further configured to process the list of unobservable tracks by moveing unobservable tracks to the list of confirmed tracks with a track quality value greater than a second track quality threshold value and measurement association statistics that indicate a number of new associations greater than or equal to $n_a$ where $n_a$ is an integer.

9. The tracking module of claim 3, wherein the track quality module is configured to predict the track quality value at a future time step P(k+1|k) given a track quality value at a current time step by multiplying a probability of a target existing for the track with the track quality value after an update at the current time step.

10. A tracking module for tracking a detected target, the tracking module comprising:
a track association module configured to associate a measurement with a track and generating measurement association statistics for the track;
a track quality module configured to generate and update a track quality value for a track based on a measurement-to-track association likelihood;
a track list update module configured to update track lists comprising a list of initial tracks, a list of confirmed tracks, and a list of unobservable tracks based on the track quality value and the measurement association statistics of the tracks in these lists; and
a track initiator configured to generate a preliminary version of the track, wherein the track quality module is configured to predict the track quality value at a future time step P(k+1|k) given a track quality value at a current time step by multiplying a probability of a target existing for the track with the track quality value after an update at the current time step and when the track is associated with a measurement at a future time step, the track quality module is configured to calculate a track quality value P(k+1|k) by calculating a first sum by adding a likelihood that the target corresponding to the track exists and the associated measurement is from the target with a likelihood that the target exists and the associated measurement is a false alarm, calculating a second sum by adding the first sum with a likelihood that the target does not exist and the associated measurement is a false alarm, and dividing the first sum by the second sum.

11. The tracking module of claim 10, wherein when the track is associated with a measurement at a future time step, the track quality module is further configured to calculate a track quality value P(k+1|k+1) according to $$P(k+1 \mid k+1) = \frac{1 - \pi_d^1(1 - \Lambda(k+1))}{1 - \pi_d^1(1 - \Lambda(k+1))P(k+1 \mid k)} P(k+1 \mid k)$$

where $\pi_d^1$ is a total detection probability inside a detection gate for the target, $$\Lambda(k+1) = \frac{f(z(k+1) \mid x(k+1 \mid k))}{f(z(k+1) \mid \varnothing)},$$

$f(z(k+1)|x(k+1|k))$ is a likelihood of a measurement $z(k+1)$ given a predicted position of the target $x(k+1|k)$, $f(z(k+1)|\varnothing)$ is a density of false alarm at $z(k+1)$ and k is the current time step.

12. A tracking module for tracking a detected target, the tracking module comprising:
a track association module configured to associate a measurement with a track and generating measurement association statistics for the track;
a track quality module configured to generate and update a track quality value for a track based on a measurement-to-track association likelihood;
a track list update module configured to update track lists comprising a list of initial tracks, a list of confirmed tracks, and a list of unobservable tracks based on the track quality value and the measurement association statistics of the tracks in these lists; and
a track initiator configured to generate a preliminary version of the track, wherein the track quality module is configured to predict the track quality value at a future time step P(k+1|k) given a track quality value at a current time step by multiplying a probability of a target existing for the track with the track quality value after an update at the current time step and when the track is not associated with a measurement at a future time step, the track quality module is configured to calculate a track quality value P(k+1|k+1) by calculating a first sum by adding a likelihood that the target corresponding to the track exists and it is not detected with a likelihood that the target does not exist, and dividing the likelihood that the target corresponding to the track exists by the first sum.

13. The tracking module of claim 12, wherein when the track is not associated with a measurement at a future time step, the track quality module is further configured to calculate a track quality value P(k+1|k+1) according to:

$$P(k+1 \mid k+1) = \frac{1 - \pi_d^2}{1 - \pi_d^2 P(k+1 \mid k)} P(k+1 \mid k)$$

where $\pi_d^2$ is a total detection probability inside the detection gate.

14. A method of detecting a target, the method comprising:
associating a measurement with a track;
generating measurement association statistics for the track;
generating and updating a track quality value for a track based on a measurement-to-track association likelihood; and
confirming and updating tracks in a track list comprising a list of confirmed tracks and a list of unobservable tracks based on the track quality value and the measurement association statistics of the tracks in this track list;

moving a confirmed track to the list of unobservable tracks if the measurement association statistics of the confirmed track indicates no measurement associations in the last $n_{na}$ time steps where $n_{na}$ is an integer; and processing the list of unobservable tracks by deleting the unobservable tracks with a track quality value less than a first track quality threshold value.

15. The method of claim 14, wherein the track list further comprises a list of initial tracks.

16. The method of claim 15, wherein the method further comprises generating a preliminary version of the track.

17. The method of claim 16, wherein, for a current time step, the method comprises associating measurements from a measurement list with the list of confirmed tracks, then the list of unobservable tracks, and then the list of initial tracks.

18. The method of claim 16, wherein, for a current time step, the method comprises:
associating measurements from a measurement list with the list of confirmed tracks;
removing the associated measurements from the measurement list to generate a first updated measurement list;
associating measurements from the first updated measurement list with the list of unobservable tracks;
removing the associated measurements from the first updated measurement list to generate a second updated measurement list;
associating measurements from the second updated measurement list and a third updated measurement list corresponding to a previous time step with the list of initial tracks; and
removing the associated measurements from the second updated measurement list to generate a third updated measurement list.

19. The method of claim 16, wherein the method comprises processing the list of initial tracks by deleting the initial tracks with a track quality value less than a first second track quality threshold value.

20. The method of claim 19, wherein the method comprises moving a remaining initial track to the list of confirmed tracks if the remaining initial track has a track quality value at the current time step and a track quality value at a previous time step that are both greater than a third track quality threshold value, and measurement association statistics that indicate a number of associations greater than or equal to $n_i$ where $n_i$ is an integer.

21. The method of claim 14, wherein the method comprises processing the list of unobservable tracks by moving unobservable tracks to the list of confirmed tracks with a track quality value greater than a second track quality threshold value and measurement association statistics that indicate a number of new associations greater than or equal to $n_a$ where $n_a$ is an integer.

22. The method of claim 16, wherein the method comprises predicting the track quality value at a future time step P(k+1|k) given a track quality value at a current time step by multiplying a probability of a target existing for the track with the track quality value after an update at the current time step.

23. A method of detecting a target, the method comprising:
associating a measurement with a track;
generating measurement association statistics for the track;
generating and updating a track quality value for a track based on a measurement-to-track association likelihood;
updating track lists comprising a list of initial tracks, a list of confirmed tracks, and list of unobservable tracks based on the track quality value and the measurement association statistics of the tracks in these lists;
generating a preliminary version of the track; and
predicting the track quality value at a future time step P(k+1|k) given a track quality value at a current time step by multiplying a probability of a target existing for the track with the track quality value after an update at the current time step, wherein when the track is associated with a measurement at a future time step, the method comprises calculating a track quality value P(k+1|k+1) by calculating a first sum by adding a likelihood that the target corresponding to the track exists and the associated measurement is from the target with a likelihood that the target exists and the associated measurement is a false alarm, calculating a second sum by adding the first sum with a likelihood that the target does not exist and the associated measurement is a false alarm, and dividing the first sum by the second sum.

24. The method of claim 23, wherein when the track is associated with a measurement at a future time step, the method further comprises calculating a track quality value P(k+1|k+1) according to $$P(k+1|k+1) = \frac{1 - \pi_d^1(1 - \Lambda(k+1))}{1 - \pi_d^1(1 - \Lambda(k+1))P(k+1|k)} P(k+1|k)$$

where $\pi_d$ is a total detection probability inside a detection gate for the target, $$\Lambda(k+1) = \frac{f(z(k+1)|x(k+1|k))}{f(z(k+1)|\varnothing)},$$

$f(z(k+1)|x(k+1|k))$ is a likelihood of a measurement $z(k+1)$ given a predicted position of the target $x(k+1|k)$, $f(z(k+1)|\varnothing)$ is a density of false alarm at $z(k+1)$ and k is the current time step.

25. A method of detecting a target, the method comprising:
associating a measurement with a track;
generating measurement association statistics for the track;
generating and updating a track quality value for a track based on a measurement-to-track association likelihood;
updating track lists comprising a list of initial tracks, a list of confirmed tracks, and list of unobservable tracks based on the track quality value and the measurement association statistics of the tracks in these lists;
generating a preliminary version of the track; and
predicting the track quality value at a future time step P(k+1|k) given a track quality value at a current time step by multiplying a probability of a target existing for the track with the track quality value after an update at the current time step, wherein when the track is not associated with a measurement at a future time step, the method comprises calculating a track quality value P(k+1|k+1) by calculating a first sum by adding a likelihood that the target corresponding to the track exists and it is not detected with a likelihood that the target does not exist, and dividing the likelihood that the target corresponding to the track exists by the first sum.

26. The method of claim 25, wherein when the track is not associated with a measurement at a future time step, the method further comprises calculating a track quality value P(k+1|k+1) according to:

$$P(k+1 \mid k+1) = \frac{1-\pi_d^2}{1-\pi_d^2 P(k+1 \mid k)} P(k+1 \mid k)$$

where $\pi_d^2$ is a total detection probability inside the detection gate.

27. A radar system comprising:
hardware configured to transmit radar pulses, receive reflected radar pulses, and process the reflected radar pulses to provide pre-processed radar data;
circuitry configured to process the pre-processed radar data to detect targets and generate plots of the detected targets; and
a tracking module configured to receive the plots and generate tracks belonging to several track lists, wherein for a given track the tracking module is configured to associate a measurement with the track and generate measurement association statistics, generate and update a track quality value for the track, determine which track list the track belongs to based upon the track quality value and the measurement association statistics of the track, and confirm and delete tracks in a list of confirmed tracks and a list of unobservable tracks based on the track quality value and the measurement association statistics for the tracks in the list of unobservable tracks, wherein the track list update module is configured to move a confirmed track to the list of unobservable tracks if the measurement association statistics of the confirmed track indicates no measurement associations in the last $n_{na}$ time steps where $n_{na}$ is an integer, and to process the list of unobservable tracks by deleting the unobservable tracks with a track quality value less than a first track quality threshold value.

* * * * *

UNITED STATES PATENT AND TRADEMARK OFFICE
CERTIFICATE OF CORRECTION

PATENT NO. : 7,626,535 B2
APPLICATION NO. : 11/756913
DATED : December 1, 2009
INVENTOR(S) : Zhen Ding et al.

It is certified that error appears in the above-identified patent and that said Letters Patent is hereby corrected as shown below:

Col. 3, line 26, delete "...|Φ" and replace with --...|∅--.

Col. 4, line 41, delete "The can" and replace with --The method can--.

Col. 5, line 8, delete "...|Φ" and replace with --...|∅--.

Col. 6, line 60, delete "required." and replace with --required).--.

Col. 11, line 65, delete "...|Φ" and replace with --...|∅--.

Col. 11, line 67, delete "...(k+1Φ)" and replace with --...(k+1|∅)--.

Col. 12, line 3, delete "...|Φ)..." and replace with --...|∅)...--.

Col. 12, line 29, delete "...|Φ)." and replace with --...|∅).--.

Col. 12, line 50, delete "in gate" and replace with --in the gate--.

Col. 12, line 50, delete "$\pi_{100}$" and replace with --$\pi_0$--.

Col. 12, line 52, delete "...$\pi_{100}$..." and replace with --...$\pi_\varnothing$...--.

Col. 16, line 13, delete "use" and replace with --used--.

Col. 19, line 23 Claim 8, delete "moveing" and replace with --moving--.

Col. 19, line 56 Claim 10, delete "P(k+1|k)" and replace with --P(k+1|k+1)--.

Col. 21, line 36 Claim 19, delete "first second" and replace with --second--.

CERTIFICATE OF CORRECTION (continued)
U.S. Pat. No. 7,626,535 B2

Col. 22, line 28 Claim 24, delete "$\pi_d$" and replace with --$\pi'_d$--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,626,535 B2 Page 1 of 1
APPLICATION NO. : 11/756913
DATED : December 1, 2009
INVENTOR(S) : Zhen Ding et al.

It is certified that error appears in the above-identified patent and that said Letters Patent is hereby corrected as shown below:

Title Page, Item (73) Assignee, delete "Raytheon Company, Waltham, MA (US)" and replace with -- Raytheon Canada Limited, Ottawa, Ontario (CA) --.

Signed and Sealed this

Twenty-seventh Day of April, 2010

David J. Kappos
*Director of the United States Patent and Trademark Office*